(12) United States Patent
Moriyama et al.

(10) Patent No.: US 7,839,397 B2
(45) Date of Patent: Nov. 23, 2010

(54) DISPLAY DRIVER AND DISPLAY PANEL MODULE

(75) Inventors: Seiichi Moriyama, Kyoto (JP); Mamoru Seike, Kyoto (JP); Jyunichi Suenaga, Osaka (JP)

(73) Assignee: Panasonic Corporation, Osaka (JP)

( * ) Notice: Subject to any disclaimer, the term of this patent is extended or adjusted under 35 U.S.C. 154(b) by 817 days.

(21) Appl. No.: 11/819,582

(22) Filed: Jun. 28, 2007

(65) Prior Publication Data

US 2008/0036749 A1 Feb. 14, 2008

(30) Foreign Application Priority Data

Feb. 8, 2007 (JP) .............................. 2007-029682
May 22, 2007 (JP) .............................. 2007-135275

(51) Int. Cl.
G09G 5/00 (2006.01)
(52) U.S. Cl. ............................ 345/204; 345/93; 345/60; 349/54; 327/526; 315/169.4
(58) Field of Classification Search ........... 345/55–103, 345/204–210; 349/54; 327/526; 315/169.3–169.4
See application file for complete search history.

(56) References Cited

U.S. PATENT DOCUMENTS

| | | | | |
|---|---|---|---|---|
| 4,368,523 A | * | 1/1983 | Kawate | 365/63 |
| 4,820,222 A | * | 4/1989 | Holmberg et al. | 445/3 |
| 4,840,459 A | * | 6/1989 | Strong | 349/55 |
| 5,555,001 A | * | 9/1996 | Lee et al. | 345/93 |
| 5,894,295 A | * | 4/1999 | Shimada et al. | 345/93 |
| 6,816,143 B1 | * | 11/2004 | Lambert | 345/93 |
| 6,879,207 B1 | * | 4/2005 | Nickolls | 327/526 |

(Continued)

FOREIGN PATENT DOCUMENTS

EP 1 202 245 A2 5/2002

(Continued)

OTHER PUBLICATIONS

European Search Report issued in European Patent Application No. EP 07111812 dated Jun. 26, 2009.

*Primary Examiner*—Lun-Yi Lao
(74) *Attorney, Agent, or Firm*—McDermott Will & Emery LLP

(57) ABSTRACT

A display driver includes: a first memory circuit for storing a line of pixels constituting an image; a second memory circuit for storing pixels of the immediately previous line; an output terminal pair switch circuit which outputs voltages each corresponding to a value of a pixel stored in the first memory circuit to a plurality of output terminals respectively corresponding to the pixels; and an inter-terminal load determination circuit for determining, for every pair of selected columns of pixels constituting the image, whether or not a short circuit is to be established between two of the plurality of output terminals which respectively correspond to the two selected columns based on values of at least three out of four pixels belonging to the two selected columns which are stored in the first and second memory circuits. If the inter-terminal load determination circuit determines that a short circuit is to be established, the output terminal pair switch circuit temporarily establishes a short circuit between the two output terminals before the voltages corresponding to the values of the pixels are output to the two output terminals.

21 Claims, 20 Drawing Sheets

U.S. PATENT DOCUMENTS

| | | |
|---|---|---|
| 7,116,137 B2 | 10/2006 | Nautiyal et al. |
| 2002/0149550 A1* | 10/2002 | Ito et al. .................. 345/87 |
| 2003/0006997 A1 | 1/2003 | Ogawa et al. |
| 2003/0174119 A1 | 9/2003 | Nishi et al. |
| 2005/0083278 A1* | 4/2005 | Teraishi .................. 345/87 |
| 2005/0110705 A1 | 5/2005 | Yang |
| 2005/0161733 A1 | 7/2005 | Cho et al. |
| 2005/0219195 A1 | 10/2005 | Yano et al. |
| 2006/0071927 A1* | 4/2006 | Chang et al. ............. 345/211 |
| 2006/0119596 A1 | 6/2006 | Lin |

FOREIGN PATENT DOCUMENTS

| | | |
|---|---|---|
| EP | 1 345 203 A1 | 9/2003 |
| JP | 09-212137 | 8/1997 |
| JP | 2001-255857 | 9/2001 |
| JP | 2003-271105 | 9/2003 |

* cited by examiner

DISPLAY DRIVER AND DISPLAY PANEL MODULE

CROSS-REFERENCE TO RELATED APPLICATIONS

This application claims priority under 35 U.S.C. §119(a) on Japanese Patent Application No. 2007-29682 filed on Feb. 8, 2007 and Japanese Patent Application No. 2007-135275 filed on May 22, 2007, the entire contents of which are hereby incorporated by reference.

BACKGROUND OF THE INVENTION

The present invention relates to a display driver for driving a display panel.

In recent years, PDPs realized as thin, large-screen, high definition display panels have been receiving attentions. The PDPs have a plurality of discharge cells arranged in a matrix as pixels and display images using emission caused by discharging of the discharge cells.

A common AC-type PDP has a plurality of display electrodes arranged in parallel and a plurality of data electrodes arranged in lines perpendicular to the lines of display electrodes. A display driver which drives these data electrodes can be considered to drive capacitive loads.

Achievement of larger screen, higher definition and higher luminance in PDPs entails the necessity of more output signals and increase in voltage of the output signals in display drivers which drives the PDPs. Therefore, suppression of power consumption caused by driving the data electrodes and suppression of heat generation by the driving are particular requirements.

Application of different potentials to two data electrodes causes these electrodes to behave as one capacitor. In other words, a capacitive load occurs between the electrodes, and large power is consumed for driving this capacitive load. Known examples of a technique for reducing such power consumption are described below.

In a liquid crystal driver example where the voltage between opposite electrodes is constant and the driver carries out dot-inversion driving, a switch is provided between output terminals, and a short-circuit is established between the output terminals. As a result, the short-circuited output terminals have closer potential values, so that power consumption by the next display driving cycle can be reduced (see, for example, Japanese Laid-Open Patent Publication No. 9-212137 (FIG. 1)).

In another liquid crystal driver example which carries out line-inversion driving, all the output terminals are connected to a common signal line at an intermediate voltage which is substantially half of a drive output voltage (see, for example, Japanese Laid-Open Patent Publication No. 2001-255857 (FIG. 1)).

Still another liquid crystal driver example has common potential lines which maintain the voltage closer to the output voltage than the intermediate voltage, i.e., maintains higher and lower voltages than the intermediate voltage. Prior to driving, the output terminal is connected to any of the common potential lines according to the tendency of change in potential of the signal at the output terminal at the time of switching of the display line. As a result, the load is decreased, so that the power consumption can be reduced (see, for example, Japanese Laid-Open Patent Publication No. 2003-271105 (FIG. 1)).

The first-described liquid crystal driver example is predicated on the dot-inversion driving. This case is achieved by AC driving, such that potentials of the opposite polarities are necessarily applied to adjacent terminals. It has also been found that, for display of the next line, the output terminal infallibly changes to a potential of the opposite polarity. Thus, control of the switch between the terminals is not affected by pixel data to be displayed.

However, in the case of a data display driver for a PDP which outputs pixel data as they are, whether or not adjacent pixels have opposite polarities and whether or not adjacent lines of pixels have opposite polarities depend on pixel data. Since various pixel data of images have no regularity, the control scheme of the first example cannot be applied to this type of driver.

The second-described liquid crystal driver example requires that signals supplied to adjacent pixels have opposite polarities. Otherwise, power loss occurs when the driver operates. Further, it is necessary to provide an additional large capacitor, or the like, which is capable of supplying an intermediate potential.

The third-described liquid crystal driver example is predicated on a driving method where predetermined high and low voltages are alternately applied. Further, it is necessary to provide an additional power supply circuit which generates higher and lower voltages than the intermediate voltage and an additional large capacitor. Incorporation of these elements into a chip increases the chip area. Provision of these elements outside the chip increases the number of components.

In display drivers for PDP, potentials applied to adjacent pixels do not necessarily have opposite polarities. In many cases, pixel data are supplied to data electrodes as they are, or data electrodes are connected to common potential lines before they are driven as in the third liquid crystal driver.

SUMMARY OF THE INVENTION

An objective of the present invention is to reduce the power consumed for driving a display panel.

According to the present invention, there is provided a display driver wherein short circuit is temporarily established between two output terminals corresponding to two columns of pixels of an image according to changes in pixel values in one of the pixel columns as well as pixel values in the other of the pixel columns before voltages corresponding to pixel values are output to the two output terminals.

More specifically, a display driver according to the present invention includes: a first memory circuit for storing a line of pixels constituting an image; a second memory circuit for storing a line of pixels immediately previous to the line of pixels stored in the first memory circuit; an output terminal pair switch circuit which outputs voltages each corresponding to a value of a pixel stored in the first memory circuit to a plurality of output terminals respectively corresponding to the pixels; and an inter-terminal load determination circuit for determining, for every pair of first and second selected columns of pixels constituting the image, whether or not a short circuit is to be established between two of the plurality of output terminals which respectively correspond to the first and second columns based on values of at least three out of four pixels belonging to the first and second columns which are stored in the first and second memory circuits. If the inter-terminal load determination circuit determines that a short circuit is to be established, the output terminal pair switch circuit temporarily establishes a short circuit between the two output terminals before the voltages corresponding to the values of the pixels belonging to the first and second columns which are stored in the first memory circuit are output to the two output terminals.

With the above-described display driver, a short circuit is established between output terminals, so that the output terminals have substantially equal potentials before the voltages corresponding to the values of pixels are output to these output terminals. The variation in output terminal potential, which is required for driving a display panel, or the like, can be decreased, so that power consumption and heat generation can be suppressed.

According to the present invention, the output terminals have substantially equal potentials before the driving operation, so that the variation in potential at output terminals in the driving operation can be reduced. As a result, the power consumption and heat generation by the display driver can be suppressed. Further, it is not necessary to supply a current to output terminals for achieving equal potentials at the output terminals. Therefore, additional wirings, power supply circuits, and other relevant elements for such a purpose are not necessary. Thus, the power consumption, circuit area, and the number of parts of peripheral circuits can be suppressed.

DESCRIPTION OF THE PREFERRED EMBODIMENTS

Hereinafter, embodiments of the present invention are described with reference to the drawings.

Figure 1:
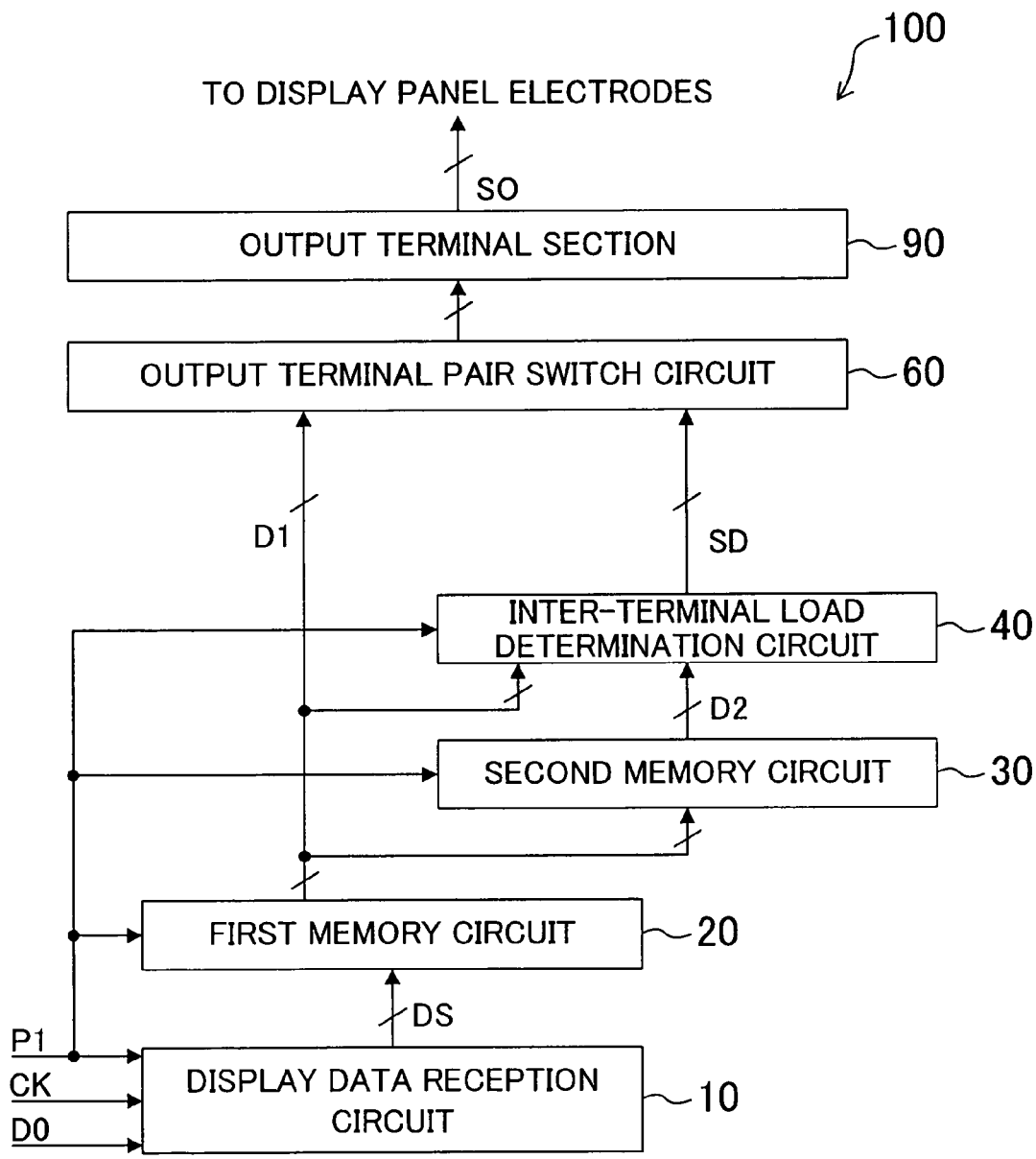
FIG. 1 is a block diagram showing the structure of a display driver according to an embodiment of the present invention.

FIG. 1 is a block diagram showing the structure of a display driver according to an embodiment of the present invention. The display driver 100 of FIG. 1 includes a display data reception circuit 10, a first memory circuit 20, a second memory circuit 30, an inter-terminal load determination circuit 40, an output terminal pair switch circuit 60, and an output terminal section 90. In an example described below, the display driver 100 is a driver for driving a display panel formed by an AC-type PDP.

The display data reception circuit 10 receives pixel data D0 which represents the values of pixels constituting an image to be displayed. Specifically, the display data reception circuit 10 receives pixel data D0, which are transferred in series, in synchronization with pulses of pixel clock CK and stores a line of the data while shifting received pixel data D0. The display data reception circuit 10 outputs to the first memory circuit 20 the stored pixel data D0 as pixel data DS on a line-by-line basis.

The first memory circuit 20 receives and stores pixel data DS on a line-by-line basis in synchronization with the timing of scan pulse signal P1 of the display panel. Then, the first memory circuit 20 outputs the stored data as pixel data D1 on a line-by-line basis to the second memory circuit 30, the inter-terminal load determination circuit 40 and the output terminal pair switch circuit 60. One period of scan pulse signal P1 corresponds to one period of pixel clock CK multiplied by the number of pixels included in one scan line.

The second memory circuit 30 receives and stores pixel data D1 on a line-by-line basis in synchronization with the timing of scan pulse signal P1 and then outputs to the inter-terminal load determination circuit 40 the stored data as previously-displayed pixel data D2 on a line-by-line basis.

As a result of the above operation, the first memory circuit 20 has pixel data D1 corresponding to a new line of pixels which are to be displayed next (display pixels), while the second memory circuit 30 has a line of pixel data D2 of previously-displayed pixels immediately previous to the line of pixel data D1.

The inter-terminal load determination circuit 40 processes the columns of pixels constituting an image on two-column by two-column basis. Specifically, herein, the descriptions of the process by the inter-terminal load determination circuit 40 are focused on two pixels of two selected columns of pixel data D1 stored in the first memory circuit 20 and two pixels of the two columns of pixel data D2 stored in the second memory circuit 30. The inter-terminal load determination circuit 40 makes a determination based on the relationships among these four pixels to generate switch control signal SD based on the determination result.

The output terminal section 90 is connected to the display panel. The output terminal section 90 has a plurality of output terminals electrically connected to a plurality of display panel electrodes and outputs load drive signal SO to the display panel electrodes. These display panel electrodes are respectively connected to a plurality of data electrodes.

The output terminal pair switch circuit 60 operates according to switch control signal SD to output pixel data D1 on a line-by-line basis or stop outputting pixel data D1 while establishing a short-circuit between the terminals of the output terminal section 90. Herein, switch control signal SD for establishing a short-circuit is rendered effective immediately after the display line is switched according to scan pulse signal P1 and the determination by the inter-terminal load determination circuit 40 is fixed, and remains effective until start of display.

Figure 2:
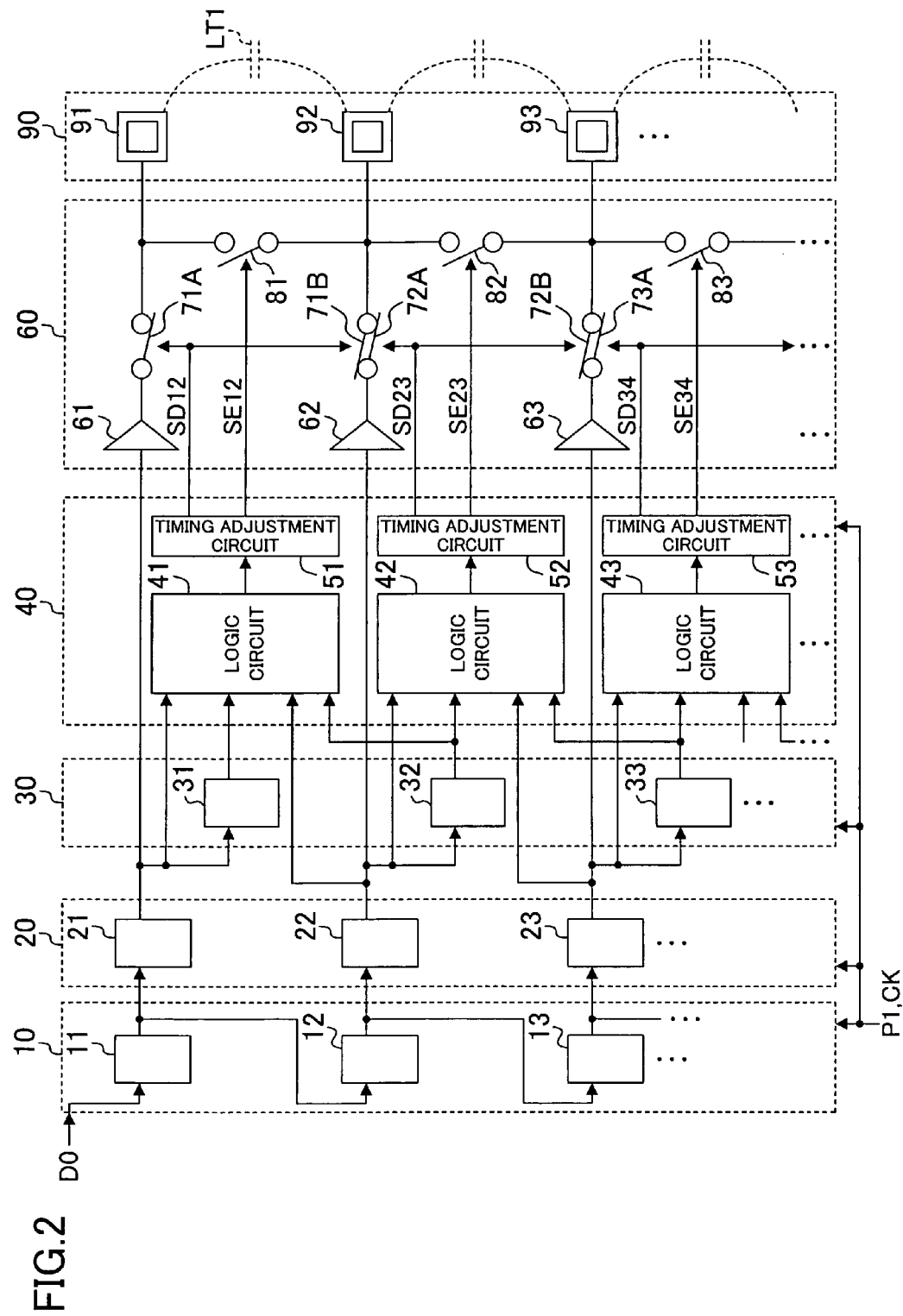
FIG. 2 is a block diagram showing the structure of the display driver of FIG. 1 in more detail.

FIG. 2 is a block diagram showing the structure of the display driver 100 of FIG. 1 in more detail. The display data reception circuit 10 includes memory elements (11, 12, 13, . . . ). The memory element 11 operates in synchronization with the pulses of pixel clock CK to receive pixel data D0 externally input in series on a pixel-by-pixel basis and output previously-received pixel data D0 to the memory element 12. The memory elements (12, 13, . . . ) sequentially shift pixel data D0 to the subsequent memory element (13, . . . ). The memory elements (11, 12, 13, . . . ) repeat reception and shifting of data till a line of pixel data D0 is entirely input into the display data reception circuit 10.

The first memory circuit 20 includes memory elements (21, 22, 23, . . . ). The memory elements (21, 22, 23, . . . ) read and store pixel data D0 stored in the corresponding memory elements (11, 12, 13, . . . ) in synchronization with scan pulse signal P1. The second memory circuit 30 includes memory elements (31, 32, 33, . . . ). The memory elements (31, 32, 33, . . . ) read and store the pixel data stored in the corresponding memory elements (21, 22, 23, . . . ) in synchronization with scan pulse signal P1.

The pixel data stored in the memory elements (21, 22, 23, . . . ) of the first memory circuit 20 in synchronization with scan pulse signal P1 are stored in the corresponding memory elements (31, 32, 33, . . . ) of the second memory circuit 30 in synchronization with next scan pulse signal P1. Therefore, the memory elements (31, 32, 33, . . . ) of the second memory circuit 30 have previously-displayed pixel data of a line immediately previous to that of the pixel data stored in the corresponding memory elements (21, 22, 23, . . . ) of the first memory circuit 20. The memory elements 21 and 31 store two of the pixels constituting an image which belong to the same column. The memory elements 22 and 32 store pixels belonging to an adjacent column.

The inter-terminal load determination circuit 40 includes logic circuits (41, 42, 43, . . . ) and timing adjustment circuits (51, 52, 53, . . . ). The logic circuit 41 determines whether or not a short circuit is to be established between two output terminals corresponding to the logic circuit 41 based on the values of at least three out of the four pixels stored in the memory elements 21 and 22 of the first memory circuit 20 and the memory elements 31 and 32 of the second memory circuit 30. The logic circuit 41 then outputs the determination result as a determination signal. The logic circuit 42 determines whether or not a short circuit is to be established between two output terminals corresponding to the logic circuit 42 based on the values of at least three out of the four pixels stored in the memory elements 22 and 23 and the memory elements 32 and 33. The logic circuit 42 then outputs the determination result as a determination signal. The other logic circuits (43, . . . ) also operate in the same way.

The timing adjustment circuit 51 adjusts the determination signal output from the logic circuit 41 to an optimum timing to output control signals SD12 and SE12 (switch control signal SD). The timing adjustment circuit 52 adjusts the determination signal output from the logic circuit 42 to an optimum timing to output control signals SD23 and SE23 (switch control signal SD). The other timing adjustment circuits (53, . . . ) also operate in the same way.

The output terminal pair switch circuit 60 includes output buffers (61, 62, 63, . . . ), output switches (71A, 71B, 72A, 72B, 73A, . . . ), and short-circuit switches (81, 82, 83, . . . ). The output terminal section 90 includes output terminals (91, 92, 93, . . . ). The output switches (71A, 71B, 72A, 72B, 73A, . . . ) and the short-circuit switches (81, 82, 83, . . . ) can be realized by, for example, transistors.

The output buffers (61, 62, 63, . . . ) adjust the voltages output according to pixel data stored in the memory elements (21, 22, 23, . . . ) to appropriate voltages and output the adjusted voltages to the output terminals (91, 92, 93, . . . ). The output buffers (61, 62, 63, . . . ) are regulated to have appropriate load drivability.

The output switches 71A and 71B control the outputs of the output buffers 61 and 62, respectively, according to control signal SD12. The output switches 72A and 72B control the outputs of the output buffers 62 and 63, respectively, according to control signal SD23. The short-circuit switch 81 establishes a short circuit between the output terminals 91 and 92 according to control signal SE12. The short-circuit switch 82 establishes a short circuit between the output terminals 92 and 93 according to control signal SE23.

The output terminals (91, 92, 93, . . . ) are connected to corresponding display panel electrodes of the PDP to output the voltages corresponding to pixel data to the display panel. The output terminals (91, 92, 93, . . . ) respectively correspond to the memory elements (21, 22, 23, . . . ) to output voltages corresponding to the values of successive pixels included in one line.

The output buffers (61, 62, 63, . . . ) may be realized by tri-state buffers. In this case, the output buffers (61, 62, 63, . . . ) can also fill the role of switches, so that it is not necessary to provide the output switches (71A, 71B, 72A, 72B, 73A, . . . ).

Determination by the inter-terminal load determination circuit 40 of FIG. 1 is now described with reference to FIG. 3A through FIG. 5B, where the determination is made based on three out of four pixels that include two of the previously-displayed pixels and two pixels of the next line respectively belonging to the same columns as the two previously-displayed pixels belong to. Each of the logic circuits (41, 42, 43, . . . ) includes first and second comparator circuits and a logical product circuit.

Figure 3A:
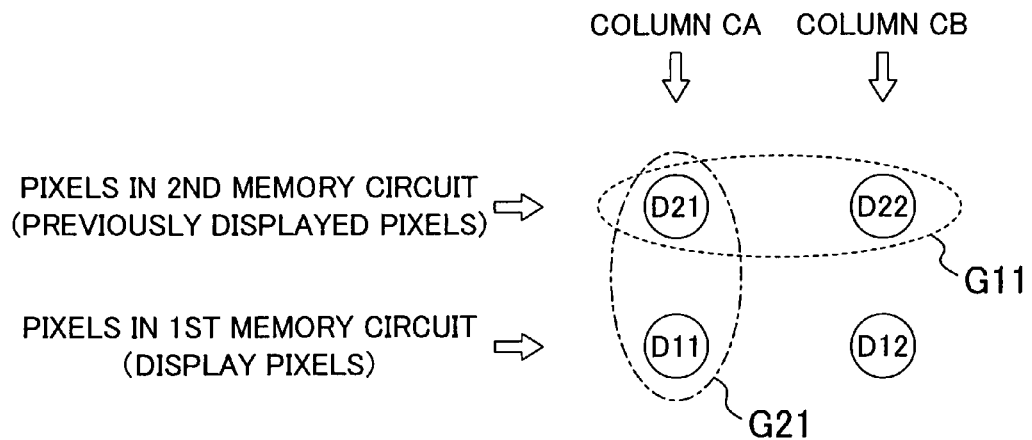
FIG. 3A illustrates the first example of pixel combination employed in determination by an inter-terminal load determination circuit of FIG. 1.
Figure 3B:
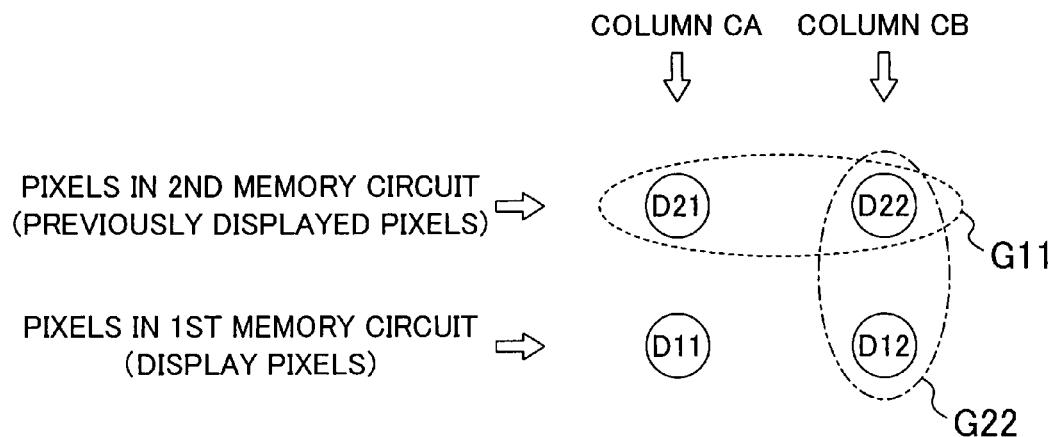
FIG. 3B illustrates a variation of the first example of FIG. 3A.

FIG. 3A illustrates the first example of pixel combination employed in determination by the inter-terminal load determination circuit 40 of FIG. 1. FIG. 3B illustrates a variation of the first example of FIG. 3A. For simplicity, only the control on the output terminals 91 and 92 of FIG. 2 is herein described.

Pixels D11 and D12 of FIG. 3A and FIG. 3B belong to a same display line and are stored in the first memory circuit 20. Pixels D21 and D22 belong to a same display line adjacent to the display line of pixels D11 and D12 and are stored in the second memory circuit 30. Pixels D11 and D21 belong to column CA. Pixels D12 and D22 belong to column CB which is adjacent to column CA.

The first and second comparator circuits of the logic circuits (41, 42, 43, . . . ) are, for example, exclusive OR circuits. First, the first comparator circuit compares the values of pixel D21 and pixel D22 belonging to the same display line (which are stored in the memory elements 31 and 32, respectively). These two pixels (group G11 of FIG. 3A) correspond to output terminals 91 and 92, respectively.

In the case where these pixels have different values, there is a potential difference between the two output terminals 91 and 92 at the time of displaying previously-displayed pixels. This means that capacitive load LT1 exists between these terminals. In this case, the first comparator circuit outputs a comparison result indicative that the values of these two pixels are not identical. On the contrary, in the case where these pixels have the same value, this means that no capacitive load exists between these two output terminals. Even if a short circuit is established between the terminals, no charge transfers between the two output terminals. Thus, it is recognized from this that no effect is produced by the short circuit. In this case, the first comparator circuit outputs a comparison result indicative that the values of these two pixels are identical.

The second comparator circuit compares the values of pixel D21 and pixel D11 belonging to the same column (which are stored in the memory elements 31 and 21, respectively). Both these two pixels (group G21) correspond to the output terminal 91. These two pixels having different values mean that the potential of the output terminal 91 changes when the display line is switched. The second comparator circuit outputs a comparison result indicative of whether or not the values of these two pixels are identical.

The logical product circuit outputs a logical product of the comparison result of the first comparator circuit and the comparison result of the second comparator circuit. Specifically, if the comparison result of the first comparator circuit is indicative of unidentical values while the comparison result of the second comparator circuit is indicative of unidentical values (namely, if pixel D21 and pixel D22 have different values while pixel D21 and pixel D11 have different values), the logical product circuit determines that a short circuit is to be established between the output terminal 91 and the output terminal 92 and outputs a determination signal such that control signals SD12 and SE12 are rendered effective for short circuit control. Accordingly, the short circuit control is performed, i.e., the output switches 71A and 71B are opened while the short-circuit switch 81 is closed. In this case, the potential of the output terminal 91 and the potential of the output terminal 92 are averaged.

In the case where the second comparator circuit detects no difference, no change occurs in the value of the pixel in the same column CA when the display line is switched. Therefore, even if the first comparator circuit detects a difference, it is not necessary to provide short circuit control between the output terminals. Thus, the power consumption is smaller when the short circuit control is not provided. In the case where the first comparator circuit detects no difference while the second comparator circuit detects a difference, there is no difference in potential between the two output terminals. Therefore, no effect is produced by the short circuit control provided between the terminals. The power consumption is smaller when the short circuit control is not provided.

Thus, when the first or second comparator circuit detects no difference, the logical product circuit outputs a determination signal such that control signals SD12 and SE12 are not rendered effective. Namely, the output switches 71A and 71B are maintained closed while the short-circuit switch 81 is maintained open.

The timing adjustment circuit 51 adjusts the timing of the determination signal generated by the logic circuit 41 to output control signals SD12 and SE12. When a short circuit is established between the terminals, the timing adjustment circuit 51 renders, after reception of scan pulse signal P1 and determination by the logic circuit 41, control signal SD12 effective to open the output switches 71A and 71B. Thereafter, the timing adjustment circuit 51 renders control signal SE12 effective to close the short-circuit switch 81.

After the passage of a predetermined period, equilibrium is attained, i.e., the output terminals 91 and 92 have substantially equal potentials. Then, the timing adjustment circuit 51 renders control signal SE12 ineffective to open the short-circuit switch 81 immediately before display on the display panel is started, and thereafter, renders control signal SD12 ineffective to close the output switches 71A and 71B.

The output switches 71A and 71B and the short-circuit switch 81 restore the normal state, so that the output terminals 91 and 92 output voltages corresponding to the pixel values of the memory elements 21 and 22, respectively. Thus, with different control timings for control signals SD12 and SE12, the output does not enter any abnormal state, so that the short circuit control between output terminals is securely carried out.

The power additionally consumed for the short circuit control is about as much as the control power for switch control. After a short circuit is established between output terminals, when the next line is displayed, the potentials of the output terminals 91 and 92 further change with the same tendency of change as that exhibited when the short circuit is established between output terminals. Thus, by averaging the potentials of the output terminals in such a way, the effects of preliminary charge or preliminary discharge are obtained. The change in potential necessary for achieving a potential which corresponds to the value of pixel D1 is about a ½ of that required in normal case. Therefore, the power necessary for driving the display panel and the heat generated by driving of the display panel can be suppressed to about ½.

Then, the control procedure on the output terminals 92 and 93 is carried out. Thereafter, the control procedure is carried out on other adjacent pairs of output terminals in the same way. The same procedure is repeated at every scan pulse. Thus, the power consumed by driving the display panel can be reduced.

As described above, in the display driver 100 of FIG. 1, whether or not a short circuit established between output terminals is effective is efficiently determined based on three pixels, in particular, two of previously-displayed pixels and one pixel belonging to the column in which one of the two previously-displayed pixels is included. There is no regularity in value among pixels.

In the example of FIG. 3B, the second comparator circuit of the logic circuit 41 compares the values of pixel D22 and pixel D12 belonging to the same column (which are stored in the memory elements 32 and 22, respectively) to output the comparison result. Both these two pixels (group G22) correspond to the output terminal 92. The other details are the same as those of the example of FIG. 3A.

It should be noted that all the output switches (71A, 71B, 72A, . . . ) may be opened immediately after scan pulse signal P1 is input, before a determination by the logic circuits (41, 42, . . . ) of the inter-terminal load determination circuit 40 is made. In this case, if any logic circuit (e.g., the logic circuit 41) determines that a short circuit is to be established between a corresponding pair of output terminals, a corresponding short-circuit switch (short-circuit switch 81) is closed to establish a short circuit between the terminals. As for a pair of output terminals which is not determined to need establishing a short circuit therebetween, a corresponding output switch (e.g., output switch 71A) is closed.

In this case, the operation of the output switch occurs in parallel within the period of the determination by the inter-terminal load determination circuit 40. Therefore, a longer period of short circuit between the output terminals for averaging the potentials can be secured.

For example, the output switches 71B and 72A connected to the same output terminal 92 may be replaced by an output switch which operates according to, for example, the logical sum of control signal SD12 and control signal SD23.

In the examples of FIG. 3A and FIG. 3B, the first comparator circuit of the logic circuit 41 may compare the value of pixel D11 and the value of pixel D12 in place of the value of pixel D21 and the value of pixel D22.

Figure 4A:
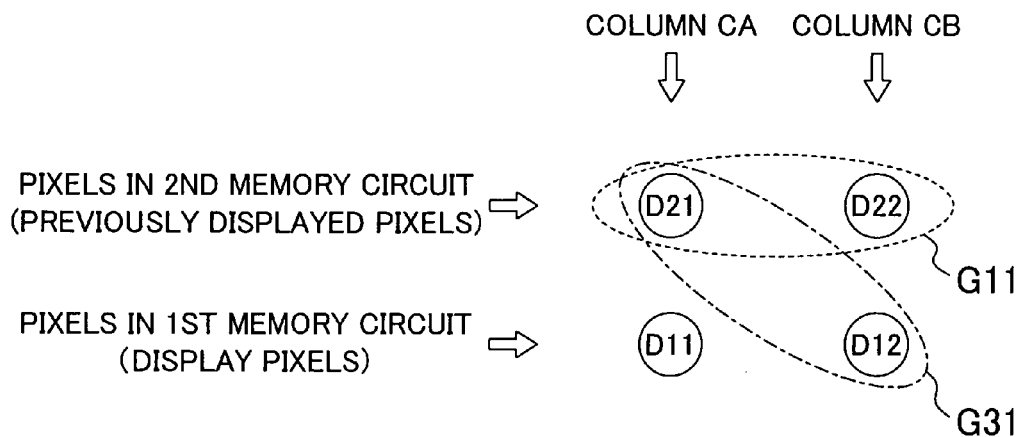
FIG. 4A illustrates the second example of pixel combination employed in determination by the inter-terminal load determination circuit of FIG. 1.
Figure 4B:
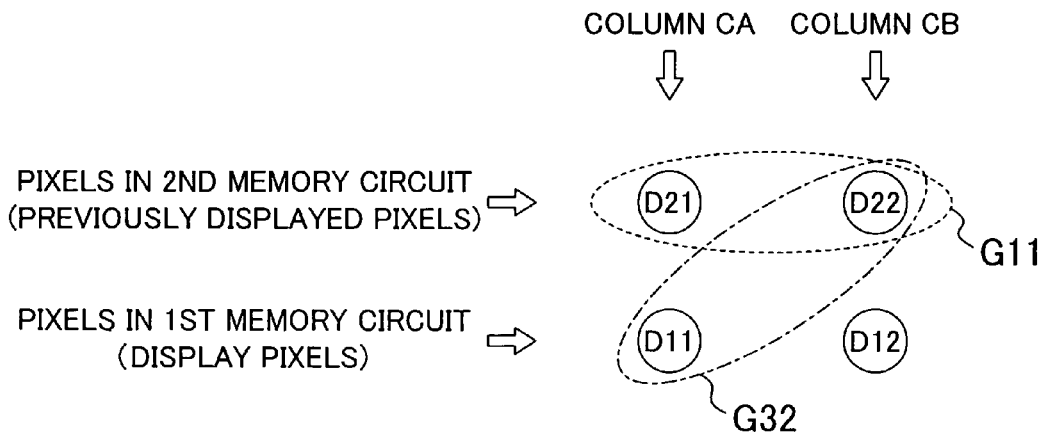
FIG. 4B illustrates a variation of the second example of FIG. 4A.

FIG. 4A illustrates the second example of pixel combination employed in determination by the inter-terminal load determination circuit 40 of FIG. 1. FIG. 4B illustrates a variation of the second example of FIG. 4A. For simplicity, only the control on the output terminals 91 and 92 of FIG. 2 is herein described.

The first comparator circuit of the logic circuit 41 compares the values of pixel D21 and pixel D22 belonging to the same display line (group G11 of FIG. 4A). The first comparator circuit outputs a comparison result indicative of whether or not the values of these two pixels are identical. The second comparator circuit of the logic circuit 41 compares the values of pixel D21 and pixel D12 belonging to different display lines and different columns (group G31). The second comparator circuit outputs a comparison result indicative of whether or not the values of these two pixels are identical. If the comparison result of the first comparator circuit is indicative of unidentical values while the comparison result of the second comparator circuit is indicative of identical values, the logical product circuit determines that a short circuit is to be established between the output terminal 91 and the output terminal 92 and outputs a determination signal such that the short circuit control is performed.

In the example of FIG. 4B, the second comparator circuit of the logic circuit 41 compares the values of pixel D11 and pixel D22 belonging to different display lines and different columns to output the comparison result (group G32). The other details are the same as those of the example of FIG. 4A.

In the examples of FIG. 4A and FIG. 4B, the first comparator circuit of the logic circuit 41 may compare the value of pixel D11 and the value of pixel D12 in place of the value of pixel D21 and the value of pixel D22.

Figure 5A:
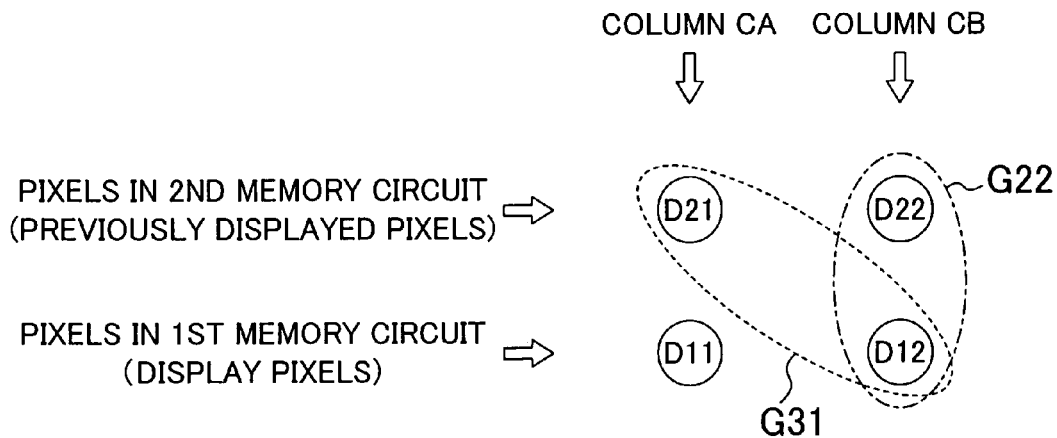
FIG. 5A illustrates the third example of pixel combination employed in determination by the inter-terminal load determination circuit of FIG. 1.
Figure 5B:
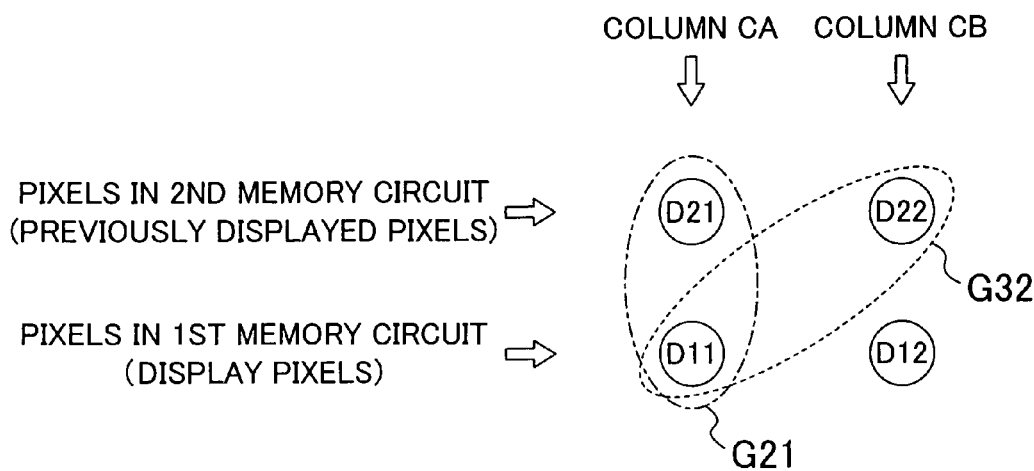
FIG. 5B illustrates a variation of the third example of FIG. 5A.

FIG. 5A illustrates the third example of pixel combination employed in determination by the inter-terminal load determination circuit 40 of FIG. 1. FIG. 5B illustrates a variation of the third example of FIG. 5A. For simplicity, only the control on the output terminals 91 and 92 of FIG. 2 is herein described.

The first comparator circuit of the logic circuit 41 compares the values of pixel D21 and pixel D12 belonging to different display lines and different columns (group G31 of FIG. 5A). The first comparator circuit outputs a comparison result indicative of whether or not the values of these two pixels are identical. The second comparator circuit of the logic circuit 41 compares the values of pixel D22 and pixel D12 belonging to the same column (group G22). The second comparator circuit outputs a comparison result indicative of whether or not the values of these two pixels are identical. If the comparison result of the first comparator circuit is indicative of identical values while the comparison result of the second comparator circuit is indicative of unidentical values, the logical product circuit determines that a short circuit is to be established between the output terminal 91 and the output terminal 92 and outputs a determination signal such that the short circuit control is performed.

In the example of FIG. 5B, the first comparator circuit of the logic circuit 41 compares the values of pixel D11 and pixel D22 belonging to different display lines and different columns to output the comparison result (group G32). The second comparator circuit of the logic circuit 41 compares the values of pixel D21 and pixel D11 belonging to the same column to output the comparison result (group G21). The other details are the same as those of the example of FIG. 5A.

Another scheme of determination by the inter-terminal load determination circuit 40 of FIG. 1 is now described with reference to FIG. 6A through FIG. 9B, where the determination is made based on four pixels that include two of the previously-displayed pixels and two pixels of the next line respectively belonging to the same columns as the two previously-displayed pixels belong to. For simplicity, only the control on the output terminals 91 and 92 of FIG. 2 is herein described. The descriptions provided herein also apply to the other output terminals. Each of the logic circuits (41, 42, 43, . . . ) includes first, second and third comparator circuits and a logical product circuit.

Figure 6A:
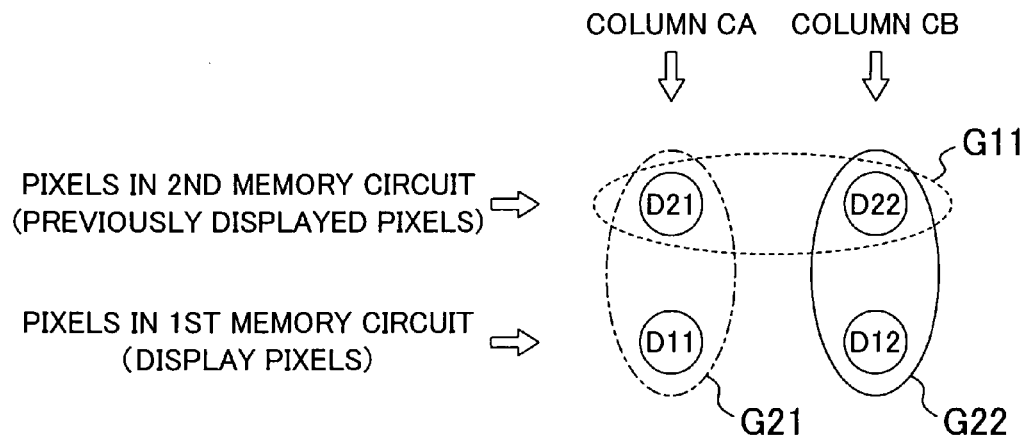
FIG. 6A illustrates the fourth example of pixel combination employed in determination by the inter-terminal load determination circuit of FIG. 1.
Figure 6B:
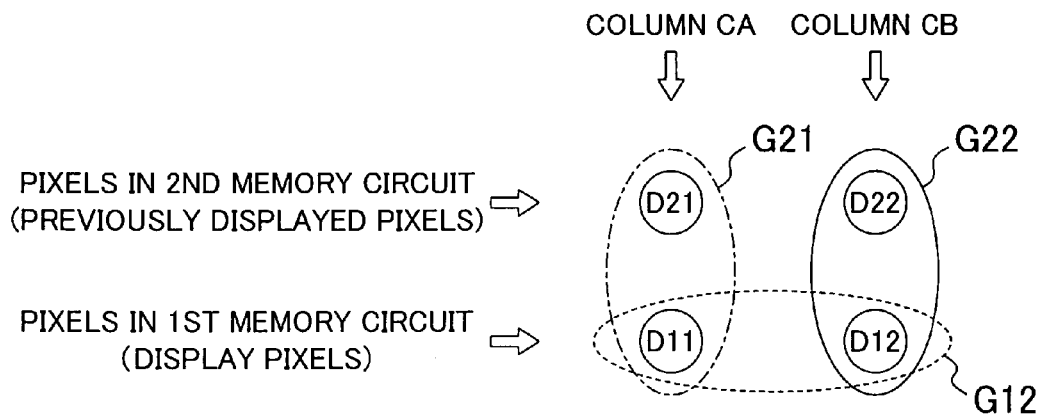
FIG. 6B illustrates a variation of the fourth example of FIG. 6A.

FIG. 6A illustrates the fourth example of pixel combination employed in determination by the inter-terminal load determination circuit 40 of FIG. 1. FIG. 6B illustrates a variation of the fourth example of FIG. 6A. The first comparator circuit of the logic circuit 41 compares the value of pixel D21 and the value of pixel D22 belonging to the same display line (group G11 of FIG. 6A). The first comparator circuit outputs a comparison result indicative of whether or not the values of these two pixels are identical. The second comparator circuit of the logic circuit 41 compares the values of pixel D21 and pixel D11 belonging to the same column (group G21). The second comparator circuit outputs a comparison result indicative of whether or not the values of these two pixels are identical.

The third comparator circuit of the logic circuit 41 compares the values of pixel D22 and pixel D12 belonging to the same column (group G22). The third comparator circuit outputs a comparison result indicative of whether or not the values of these two pixels are identical. If all the comparison results of the first, second and third comparator circuits are indicative of unidentical values, the logical product circuit determines that a short circuit is to be established between the output terminal 91 and the output terminal 92 and outputs a determination signal such that the short circuit control is performed.

In the example of FIG. 6B, the first comparator circuit of the logic circuit 41 compares the values of pixel D11 and pixel D12 belonging to the same display line to output the comparison result (group G12). The other details are the same as those of the example of FIG. 6A.

Figure 7A:
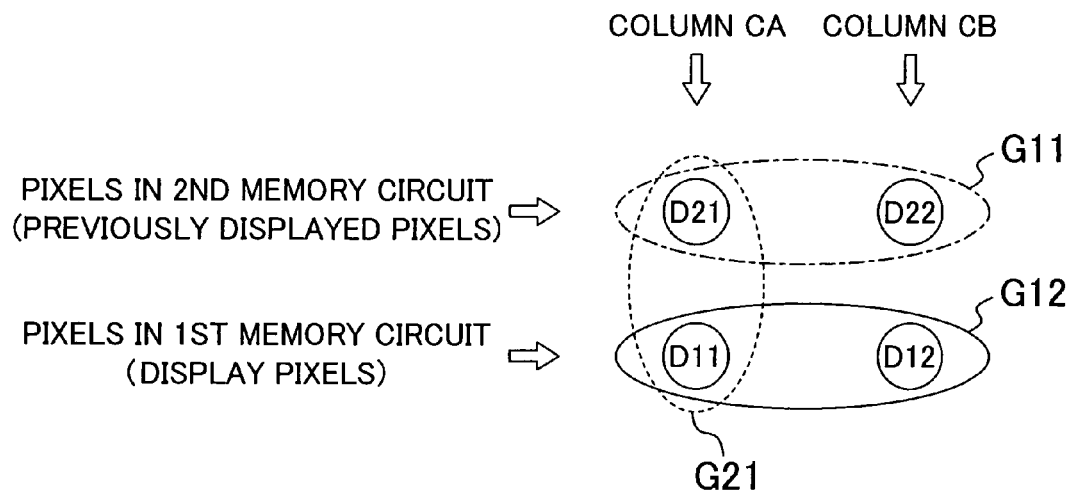
FIG. 7A illustrates the fifth example of pixel combination employed in determination by the inter-terminal load determination circuit of FIG. 1.
Figure 7B:
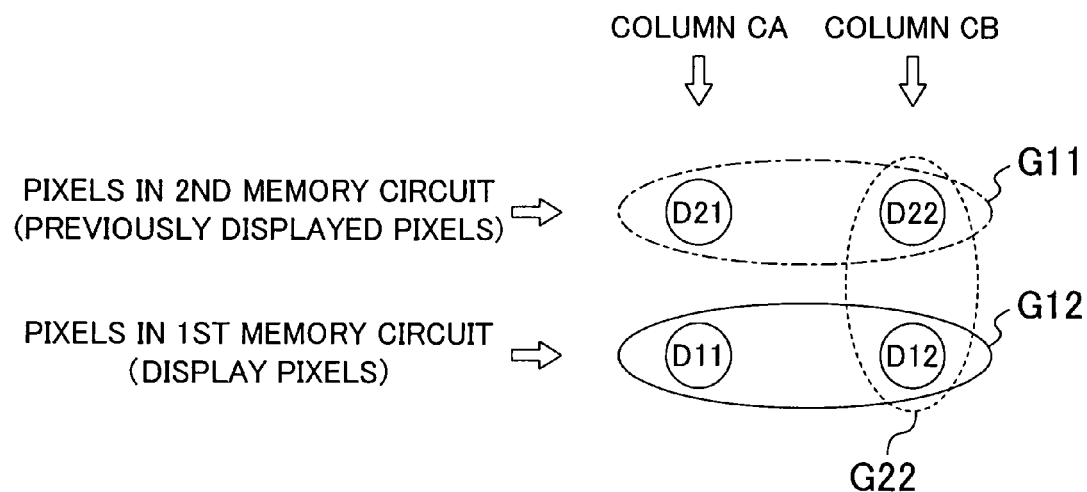
FIG. 7B illustrates a variation of the fifth example of FIG. 7A.

FIG. 7A illustrates the fifth example of pixel combination employed in determination by the inter-terminal load determination circuit 40 of FIG. 1. FIG. 7B illustrates a variation of the fifth example of FIG. 7A. The first comparator circuit of the logic circuit 41 compares the value of pixel D21 and the value of pixel D11 belonging to the same column (group G21 of FIG. 7A). The first comparator circuit outputs a comparison result indicative of whether or not the values of these two pixels are identical. The second comparator circuit of the logic circuit 41 compares the values of pixel D21 and pixel D22 belonging to the same display line (group G11). The second comparator circuit outputs a comparison result indicative of whether or not the values of these two pixels are identical.

The third comparator circuit of the logic circuit 41 compares the values of pixel D11 and pixel D12 belonging to the same display line (group G12). The third comparator circuit outputs a comparison result indicative of whether or not the values of these two pixels are identical. If all the comparison results of the first, second and third comparator circuits are indicative of unidentical values, the logical product circuit determines that a short circuit is to be established between the output terminal 91 and the output terminal 92 and outputs a determination signal such that the short circuit control is performed.

In the example of FIG. 7B, the first comparator circuit of the logic circuit 41 compares the values of pixel D22 and pixel D12 belonging to the same column to output the comparison result (group G22). The other details are the same as those of the example of FIG. 7A.

Figure 8A:
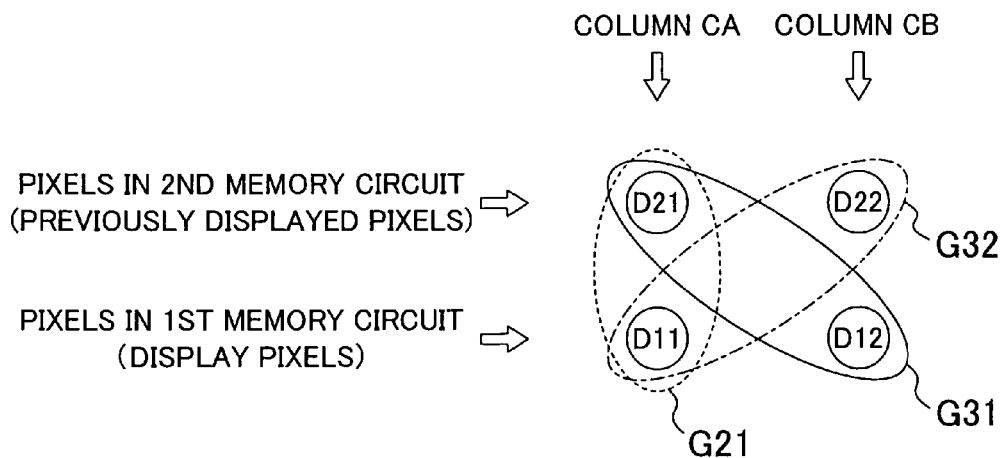
FIG. 8A illustrates the sixth example of pixel combination employed in determination by the inter-terminal load determination circuit of FIG. 1.
Figure 8B:
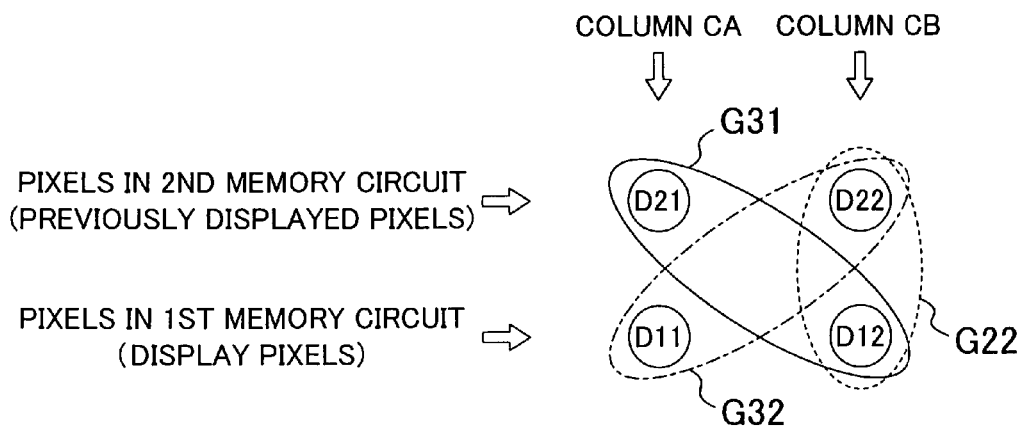
FIG. 8B illustrates a variation of the sixth example of FIG. 8A.

FIG. 8A illustrates the sixth example of pixel combination employed in determination by the inter-terminal load determination circuit 40 of FIG. 1. FIG. 8B illustrates a variation of the sixth example of FIG. 8A. The first comparator circuit of the logic circuit 41 compares the value of pixel D21 and the value of pixel D11 belonging to the same column (group G21 of FIG. 8A). The first comparator circuit outputs a comparison result indicative of whether or not the values of these two pixels are identical. The second comparator circuit of the logic circuit 41 compares the values of pixel D21 and pixel D12 belonging to different display lines and different columns (group G31). The second comparator circuit outputs a comparison result indicative of whether or not the values of these two pixels are identical.

The third comparator circuit of the logic circuit 41 compares the values of pixel D11 and pixel D22 belonging to different display lines and different columns (group G32). The third comparator circuit outputs a comparison result indicative of whether or not the values of these two pixels are identical. If the comparison result of the first comparator circuit is indicative of unidentical values while the comparison results of the second and third comparator circuits are indicative of identical values, the logical product circuit determines that a short circuit is to be established between the output terminal 91 and the output terminal 92 and outputs a determination signal such that the short circuit control is performed.

In the example of FIG. 8B, the first comparator circuit of the logic circuit 41 compares the values of pixel D22 and pixel D12 belonging to the same column to output the comparison result (group G22). The other details are the same as those of the example of FIG. 8A.

Figure 9A:
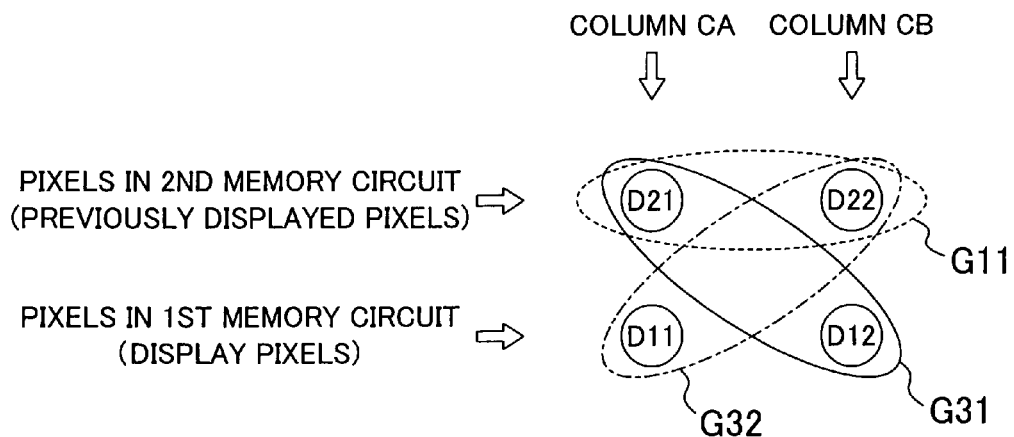
FIG. 9A illustrates the seventh example of pixel combination employed in determination by the inter-terminal load determination circuit of FIG. 1.
Figure 9B:
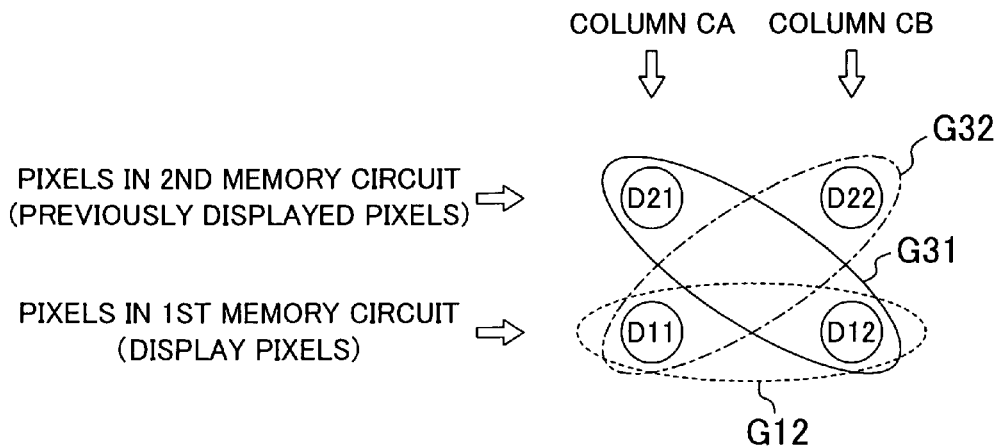
FIG. 9B illustrates a variation of the seventh example of FIG. 9A.

FIG. 9A illustrates the seventh example of pixel combination employed in determination by the inter-terminal load determination circuit 40 of FIG. 1. FIG. 9B illustrates a variation of the seventh example of FIG. 9A. The first comparator circuit of the logic circuit 41 compares the values of pixel D21 and pixel D22 belonging to the same display line (group G11 of FIG. 9A). The first comparator circuit outputs a comparison result indicative of whether or not the values of these two pixels are identical. The second and third comparator circuits of the logic circuit 41 operate in the same way as described in the example of FIG. 8A, and therefore, the descriptions thereof are herein omitted. If the comparison result of the first comparator circuit is indicative of unidentical values while the comparison results of the second and third comparator circuits are indicative of identical values, the logical product circuit determines that a short circuit is to be established between the output terminal 91 and the output terminal 92 and outputs a determination signal such that the short circuit control is performed.

In the example of FIG. 9B, the first comparator circuit of the logic circuit 41 compares the values of pixel D11 and pixel D12 belonging to the same display line to output the comparison result (group G12). The other details are the same as those of the example of FIG. 9A.

In the examples of FIG. 4A to FIG. 9B, the other logic circuits (42, 43, . . . ) carry out the same determination procedure for corresponding output terminals as described above as to the logic circuit 41, and output determination signals according to their determination results such that the short circuit control is performed.

It should be noted that other possible combinations than those illustrated in FIG. 3A to FIG. 9B may be applied to the four pixels that include two of the previously-displayed pixels and two pixels of the next line respectively belonging to the same columns as the two previously-displayed pixels belong to or applied to three out of these four pixels.

In consideration of simple circuit structure and efficient circuit area, column CA and column CB are adjacent columns in the above descriptions of FIG. 3A to FIG. 9B. However, column CA and column CB may not be adjacent columns. That is, column CA and column CB may be arbitrary columns so long as they are different columns no matter how they are selected. In this case, a short circuit switch is provided between two output terminals corresponding to two selected columns. The short circuit switch and the output switches connected to these output terminals are controlled according to determination results.

When a line of pixel data is processed, the inter-terminal load determination circuit 40 may select pairs of columns for determination with repetitive selection disallowed or may select pairs of columns for determination with repetitive selection allowed. In the case where the pairs of columns are selected with repetitive selection disallowed, short circuit control between output terminals is carried out on every two output terminals. In the case where the pairs of columns are selected with repetitive selection allowed, the inter-terminal load determination circuit 40 makes, for example, not only an determination with pixels of column CA and column CB but also a determination with pixels of another column (e.g., column CC) and column CB. In this case, assuming that, for example, columns CA, CB and CC respectively correspond to the output terminals 91, 92 and 93 of FIG. 2, the inter-terminal load determination circuit 40 controls the switches such that a short circuit is established among the three output terminals 91, 92 and 93 as well as a short circuit established between the output terminal 91 and the output terminal 92. Alternatively, the inter-terminal load determination circuit 40 may likewise control the switches such that a short circuit is established among a larger number of output terminals.

Figure 10:
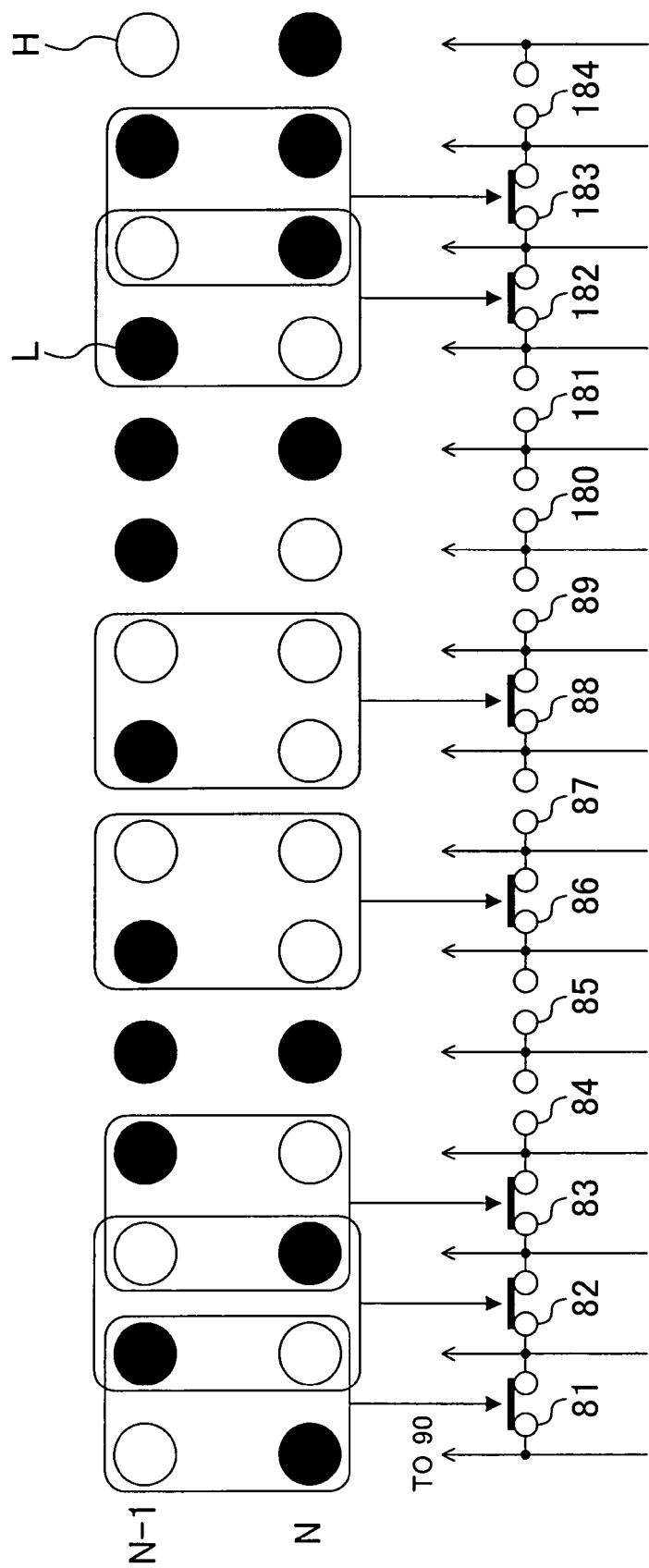
FIG. 10 is a schematic view illustrating a specific example of the operation of a short circuit switch of FIG. 2.

FIG. 10 is a schematic view illustrating a specific example of the operation of a short circuit switch of FIG. 2. FIG. 10 shows pixels of the Nth and (N−1)th lines and short circuit switches 81 to 89 and 180 to 184. The pixels of the Nth line are about to be displayed, while the pixels of the (N−1)th line are previously-displayed pixels. White circle means that the pixel is Light-ON (high-level ("H") signal is output from a corresponding output terminal). Black circle means that the pixel is Light-OFF (low-level ("L") signal is output from a corresponding output terminal).

The display driver 100 of FIG. 2 repeatedly includes the above-described circuit unit. The short circuit switches 84 to 89 and 180 to 184 are included in the output terminal pair switch circuit 60 and follow below the short circuit switches 81 to 83 of FIG. 2. In the example described herein, the inter-terminal load determination circuit 40 employs the pixel combination illustrated in FIG. 3A for determination.

For example, as for four pixels of the leftmost (first) and second columns of FIG. 10, the two pixels of the (N−1)th line have different values while the two pixels of the first column have different values. Accordingly, the logic circuit 41 outputs a determination signal such that the short circuit control is performed. As a result, the short circuit switch 81 becomes conductive. As for four pixels of the second and third columns of FIG. 10, the two pixels of the (N−1)th line have different values while the two pixels of the second column have different values. Accordingly, the logic circuit 42. outputs a determination signal such that the short circuit control is to be performed. As a result, the short circuit switch 82 becomes conductive. Likewise, the short circuit switch 83 also becomes conductive, so that the potentials are averaged among the output terminals corresponding to the pixels of the first to fourth columns.

Figure 11:
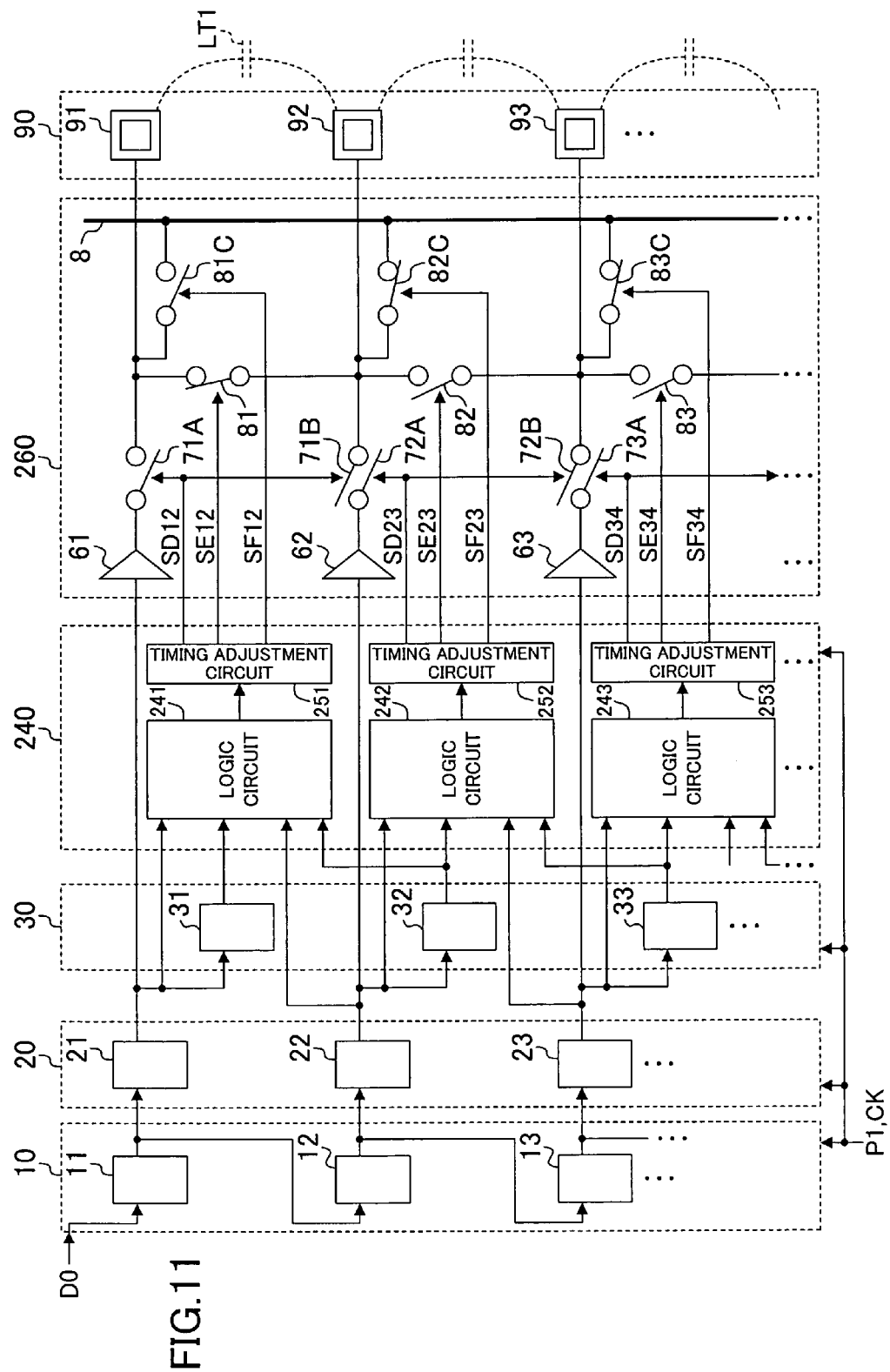
FIG. 11 is a block diagram showing the structure of a variation of the display driver of FIG. 1.

FIG. 11 is a block diagram showing the structure of a variation of the display driver of FIG. 1. The display driver of FIG. 11 is different from the display driver shown in FIG. 1 and FIG. 2 in that the display driver of FIG. 11 includes an inter-terminal load determination circuit 240 and an output terminal pair switch circuit 260 in place of the inter-terminal load determination circuit 40 and the output terminal pair switch circuit 60.

The inter-terminal load determination circuit 240 includes logic circuits (241, 242, 243, . . . ) and timing adjustment circuits (251, 252, 253, . . . ). The output terminal pair switch circuit 260 includes a common line 8 and common line connection switches (81C, 82C, 83C, . . . ) in addition to the components of the output terminal pair switch circuit 60.

The common line connection switches (81C, 82C, 83C, . . . ) respectively correspond to the output terminals (91, 92, 93, . . . ) to connect the corresponding output terminals with the common line 8. The common line connection switches (81C, 82C, 83C, . . . ) can be realized by, for example, transistors. The common line 8 is supplied by the power supply circuit with a voltage substantially equal to the average of "H" and "L" (about a ½ of supply voltage VDD).

The logic circuit 241 has substantially the same structure as that of the logic circuit 41 except for the following aspects. If the logic circuit 241 detects that control signal SE12 is not rendered effective (i.e., the short-circuit switch 81 is not closed) while the value of the pixel changes in a column corresponding to the output terminal 91 of the pixel (pixel D21 and pixel D11 of column CA in, e.g., the example of FIG. 3A have different values), the logic circuit 241 outputs a determination signal such that control signal SF12 is rendered effective. When control signal SF12 is effective, the common line connection switch 81C establishes a short circuit between the output terminal 91 and the common line 8. The other logic circuits (242, 243, . . . ) and timing adjustment circuits (252, 253, . . . ) also operate in the same way except that relevant control signals are different.

It should be noted that the common line 8 may not be supplied with a voltage by the power supply circuit. In this case, the potentials are averaged among the output terminals connected to the common line 8. Alternatively, the common line 8 may be connected to a large capacitor which is capable of maintaining about a ½ of supply voltage VDD.

Figure 12:
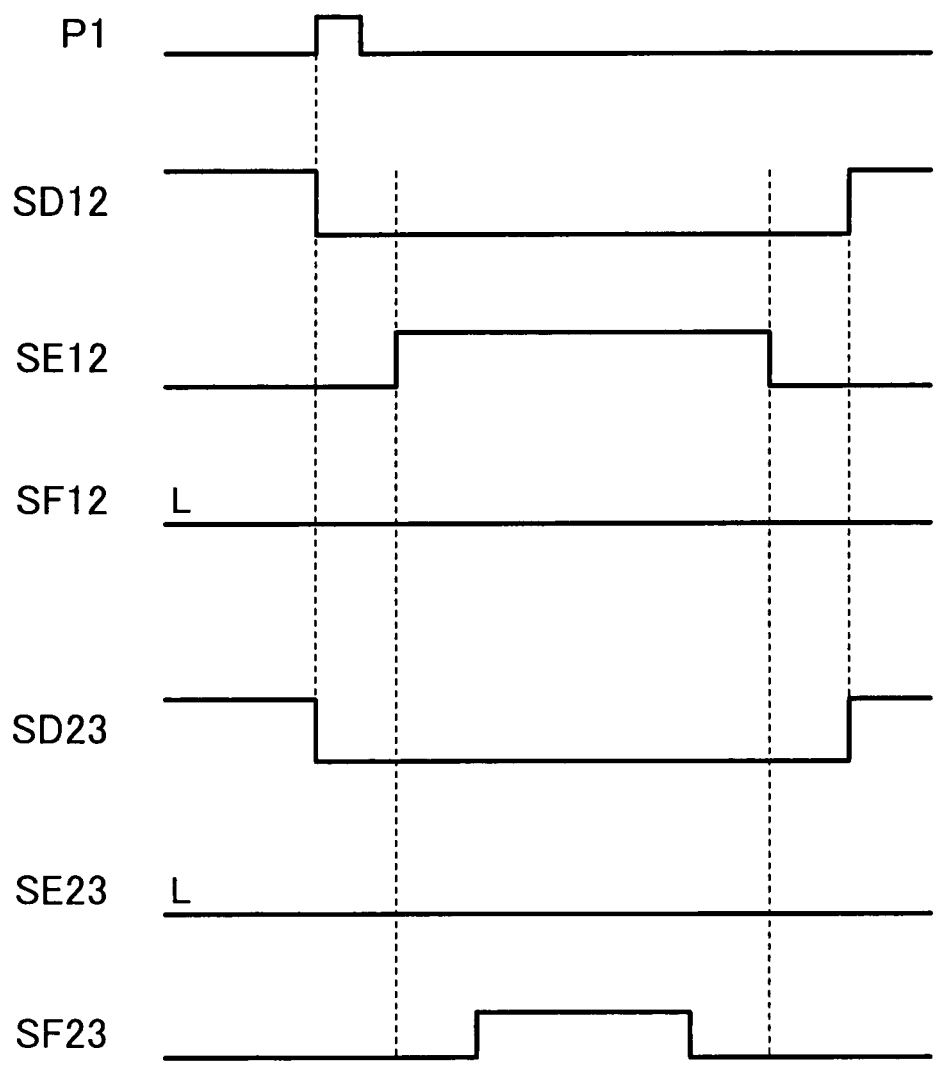
FIG. 12 is a timing chart of control signals output from two timing adjustment circuits of FIG. 11.

FIG. 12 is a timing chart of control signals output from the two timing adjustment circuits 251 and 252 of FIG. 11. The timing adjustment circuit 251 adjusts the timing of the determination signal generated by the logic circuit 241 to output control signals SD12, SE12 and SF12 (switch control signal SD). If the logic circuit 241 determines that a short circuit is to be established between the output terminals 91 and 92, the timing adjustment circuit 251 renders, after reception of scan pulse signal P1 and determination by the logic circuit 241, control signal SD12 effective ("L") to open the output switches 71A and 71B. Thereafter, the timing adjustment circuit 251 renders control signal SE12 effective ("H") to close the short-circuit switch 81. Meanwhile, control signal SF12 remains ineffective ("L"), so that the common line connection switch 81C remains open.

After the passage of a predetermined period, the timing adjustment circuit 251 renders control signal SE12 ineffective ("L") to open the short-circuit switch 81, and thereafter, renders control signal SD12 ineffective ("H") to close the output switches 71A and 71B.

The timing adjustment circuits 252 adjusts the timing of the determination signal generated by the logic circuit 242 to output control signals SD23, SE23 and SF23 (switch control signal SD). If the logic circuit 242 determines that a short circuit is not to be established between the output terminals 92 and 93 (control signal SE23 is not to be rendered effective) while detecting that the value of the pixel changes in a column corresponding to the output terminal 92 of the pixel, the timing adjustment circuit 252 renders control signal SF23 effective ("H") after the timing when the level of a signal which controls the short circuit switch (control signal SE12, SE23, or the like) changes. Accordingly, the common line connection switch 82C closes. Meanwhile, control signal SE23 remains ineffective ("L"), so that the short-circuit switch 82 remains open.

Thereafter, the potential of the output terminal 92 becomes substantially equal to the potential of the common line 8. Before the timing when the level of a signal which controls the short circuit switch (control signal SE12, SE23, or the like) changes, the timing adjustment circuit 252 renders control signal SF23 ineffective ("L") to open the common line connection switch 82C. In this way, the control timings of the common line connection switches (e.g., 81C and 82C) are rendered different from those of the short-circuit switches (e.g., 81 and 82).

Figure 13:
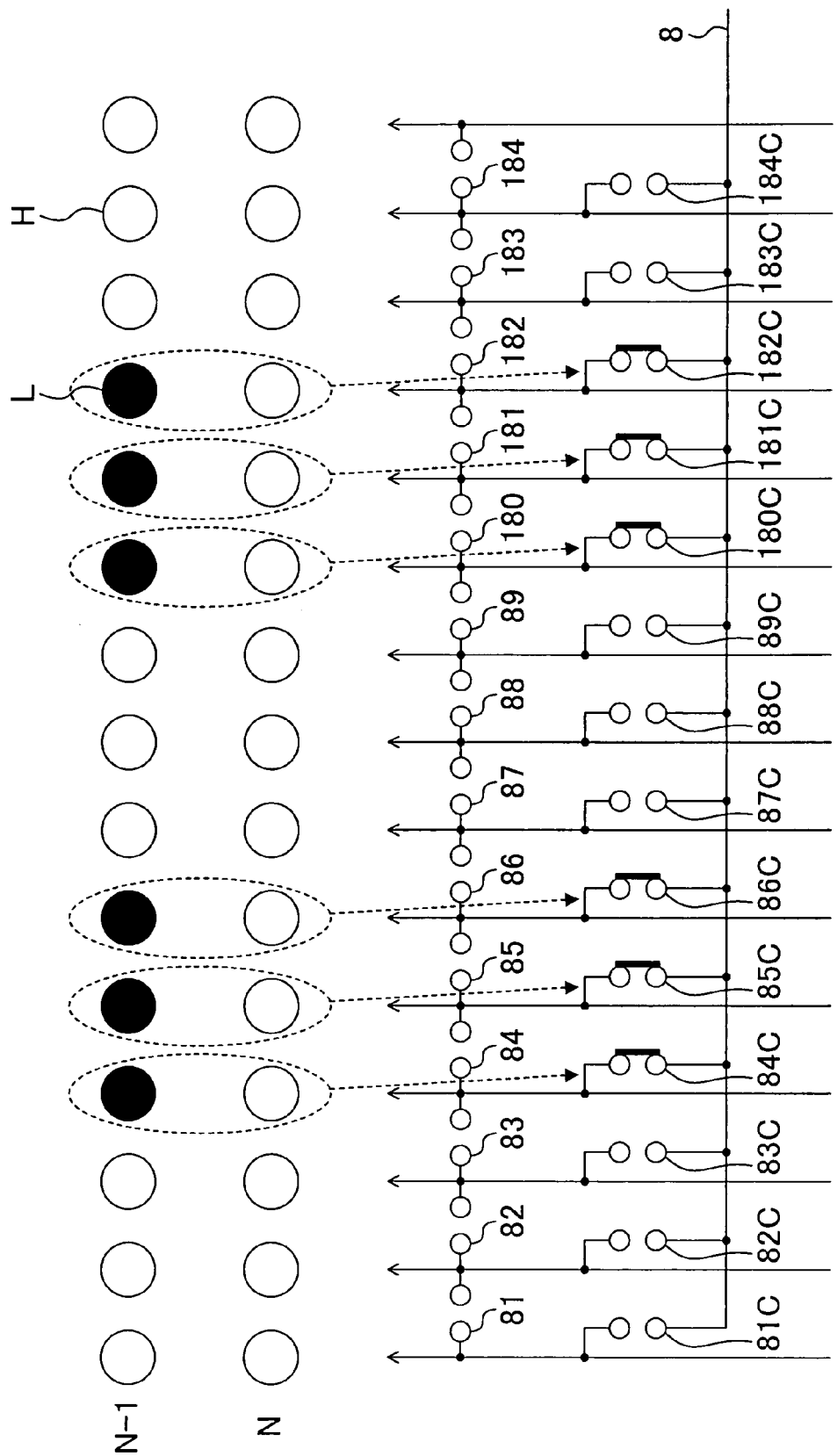
FIG. 13 is a schematic view illustrating the first specific example of the operation of the short circuit switches and common line connection switches of FIG. 11.
Figure 14:
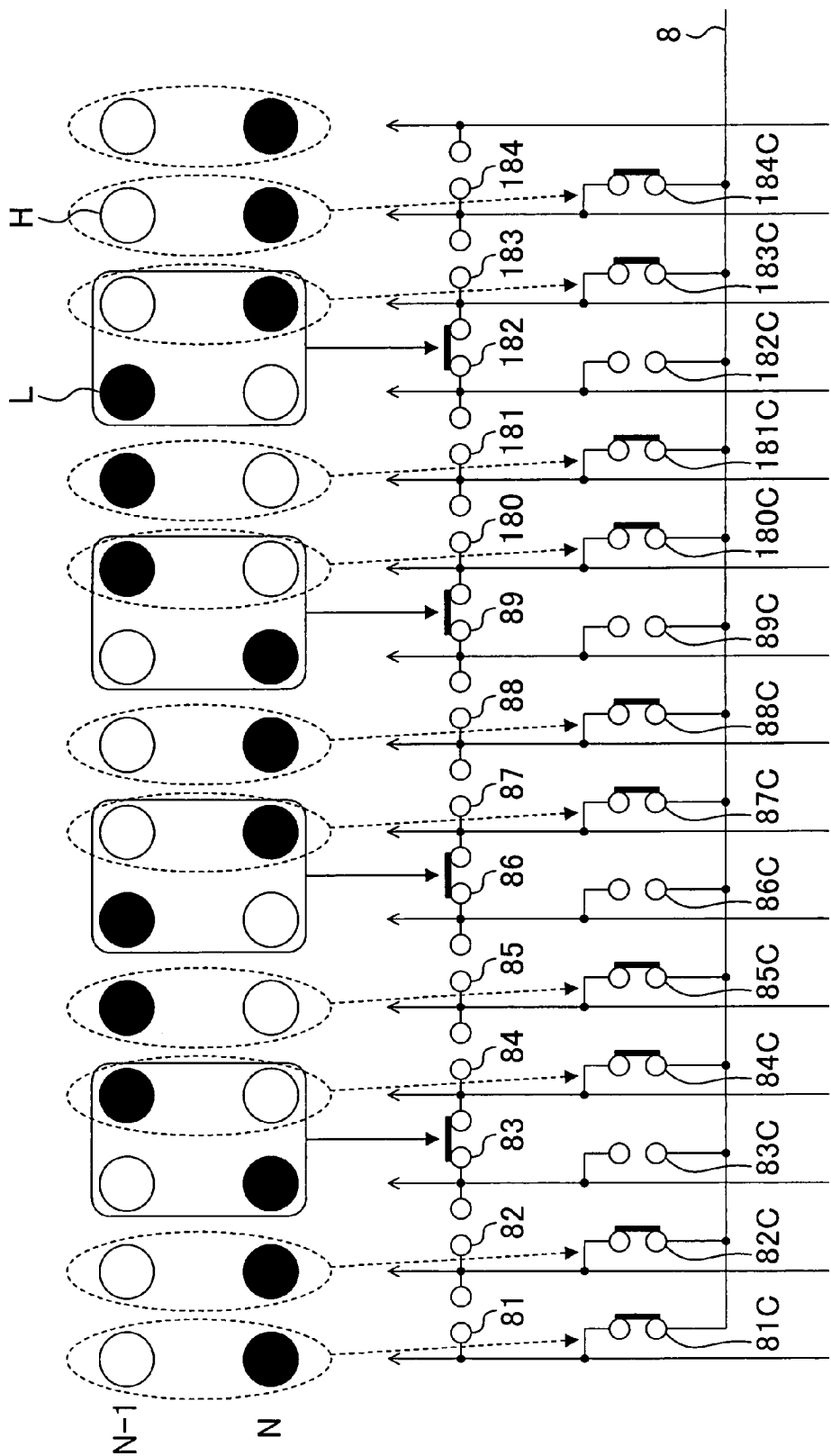
FIG. 14 is a schematic view illustrating the second specific example of the operation of the short circuit switches and common line connection switches of FIG. 11.
Figure 15:
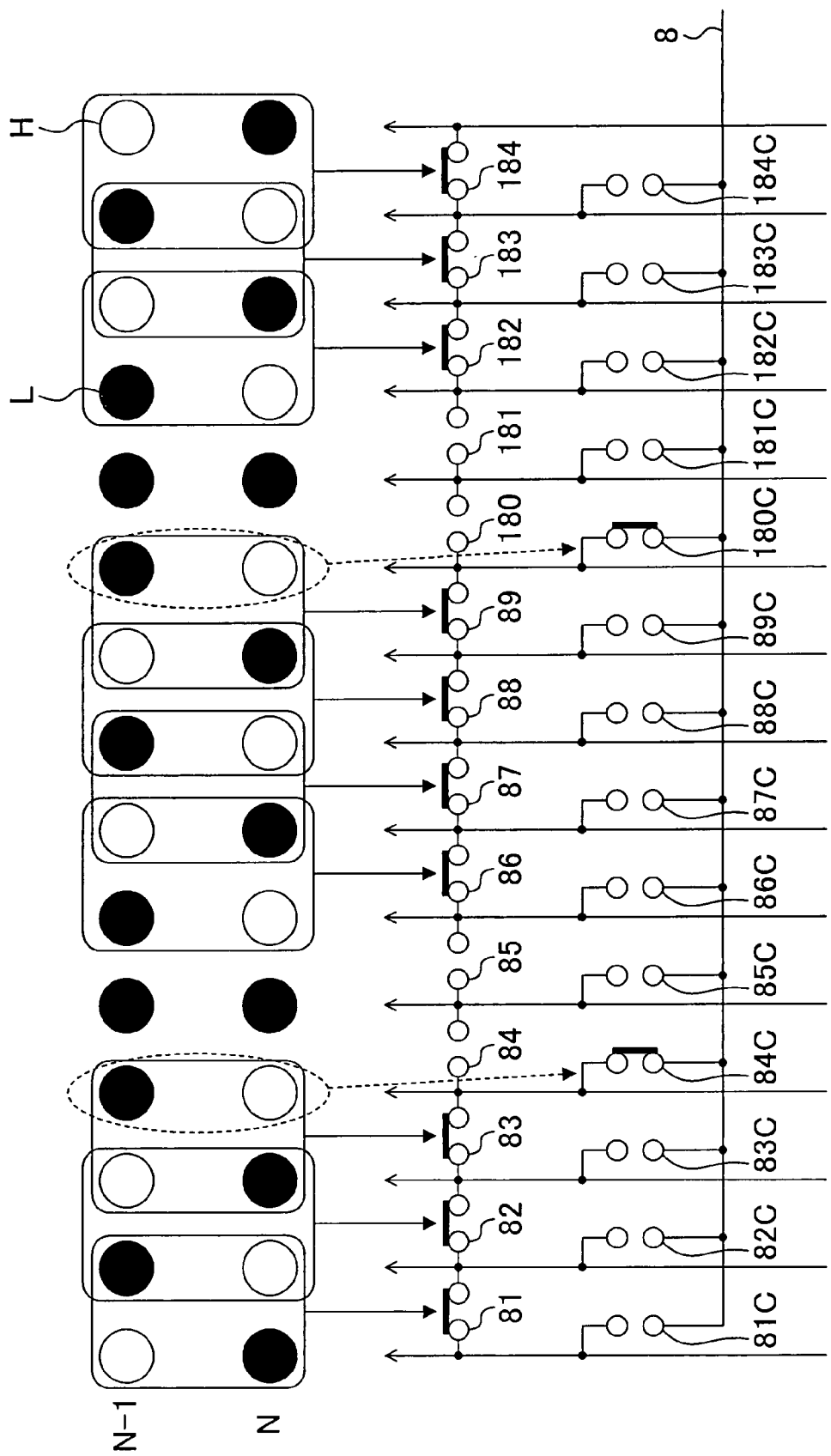
FIG. 15 is a schematic view illustrating the third specific example of the operation of the short circuit switches and common line connection switches of FIG. 11.

FIG. 13 is a schematic view illustrating the first specific example of the operation of the short circuit switches and common line connection switches of FIG. 11. FIG. 13 shows the pixels of the Nth and (N−1)th lines, short circuit switches 81 to 89 and 180 to 184, and common line connection switches 81C to 89C and 180C to 184C. The display driver of FIG. 11 repeatedly includes this circuit unit. The common line connection switches 84C to 89C and 180C to 184C are included in the output terminal pair switch circuit 260 and follow below the common line connection switches 81C to 83C of FIG. 11. In the examples of FIG. 13 to FIG. 15, the inter-terminal load determination circuit 240 employs the pixel combination illustrated in FIG. 6A for determination.

In the example of FIG. 13, no short circuit is established between terminals for any of the pairs of adjacent pixel columns. However, in a column where the pixel of the (N−1)th line and the pixel of the Nth line have different values, the corresponding common line connection switch closes. Namely, the common line connection switches 84C, 85C, 86C, 180C, 181C and 182C are turned ON. Therefore, in the case of the pixel arrangement as shown in FIG. 13, the display driver of FIG. 11 can modulate the potentials of the output terminals which change at the time of display of the next line to be substantially equal to VDD/2, although the display driver of FIG. 2 cannot average the potentials of the output terminals.

FIG. 14 is a schematic view illustrating the second specific example of the operation of the short circuit switches and common line connection switches of FIG. 11. FIG. 14 shows a different pixel pattern from that of FIG. 13. In the example of FIG. 14, the short circuit switches 83, 86, 89 and 182 are closed while some common line connection switches (e.g., 81C and 82C) are closed. Therefore, more output terminals can have potentials substantially equal to VDD/2.

FIG. 15 is a schematic view illustrating the third specific example of the operation of the short circuit switches and common line connection switches of FIG. 11. In the example of FIG. 15, the common line connection switches 84C and 180C are closed while some short circuit switches (e.g., 81 and 82) are closed.

Figure 16:
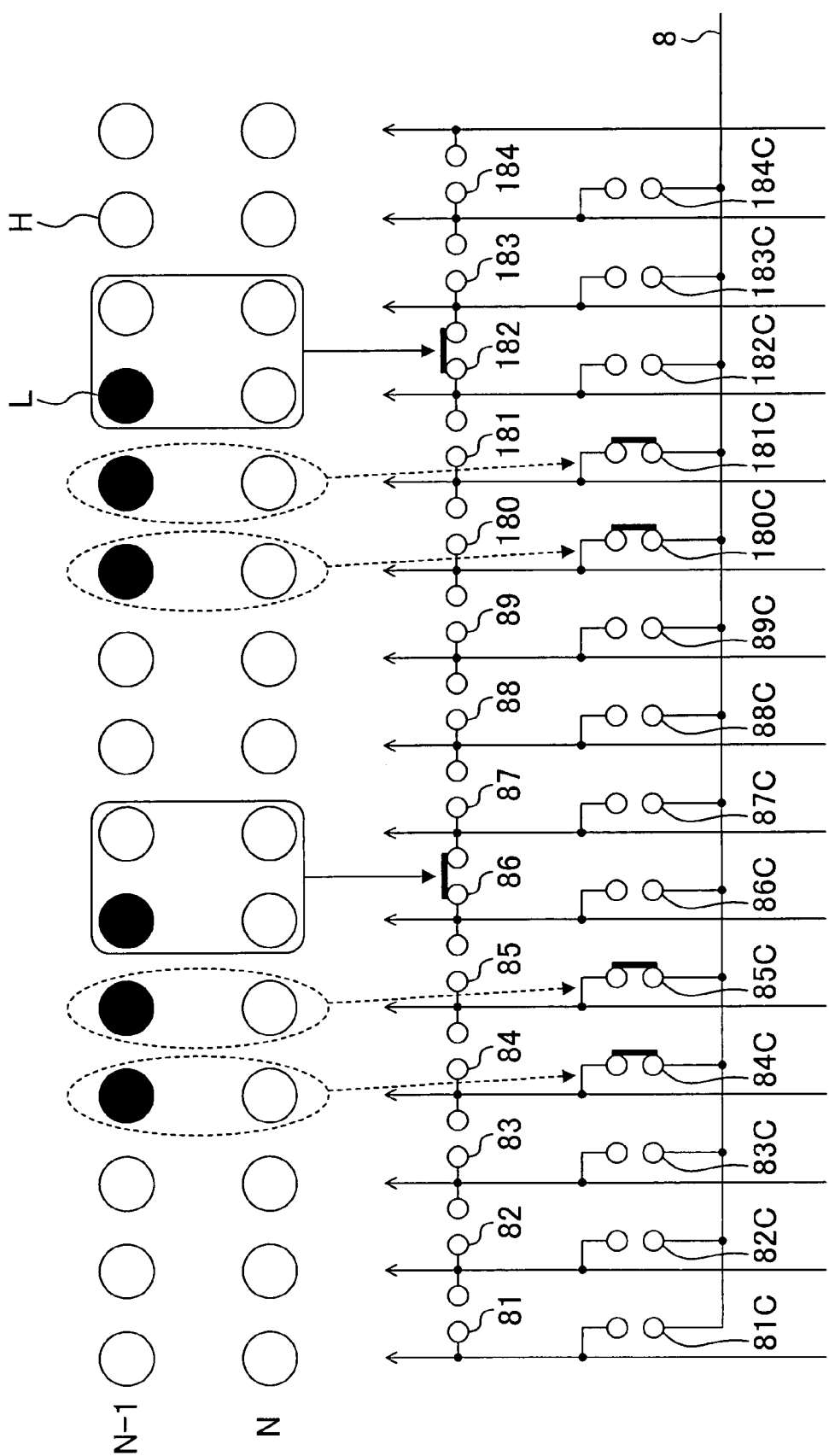
FIG. 16 is a schematic view illustrating the fourth specific example of the operation of the short circuit switches and common line connection switches of FIG. 11.

FIG. 16 is a schematic view illustrating the fourth specific example of the operation of the short circuit switches and common line connection switches of FIG. 11. In the example of FIG. 16, the inter-terminal load determination circuit 240 employs the pixel combination illustrated in FIG. 3A for determination. In this case, the short circuit switches 86 and 182 are closed while some common line connection switches (e.g., 84C and 85C) are closed. Thus, in the display driver of FIG. 11, this example is particularly effective when successive pixels in one line have the same value.

In the display driver of FIG. 11, corresponding short circuit switches and common line connection switches are controlled based on two columns of pixels, so that the control of the switches can be realized with a relatively simple circuit. However, for example, the common line connection switch 84C of FIG. 14 needs not to be closed because the potentials of the output terminals are averaged only by closing the short circuit switch 83. For the same reason, the common line connection switches 87C, 180C and 183C of FIG. 14 and the common line connection switches 84C and 180C of FIG. 15 need not to be closed. Now, a driver where a common line connection switch which needs not to be closed is not closed is described.

Figure 17:
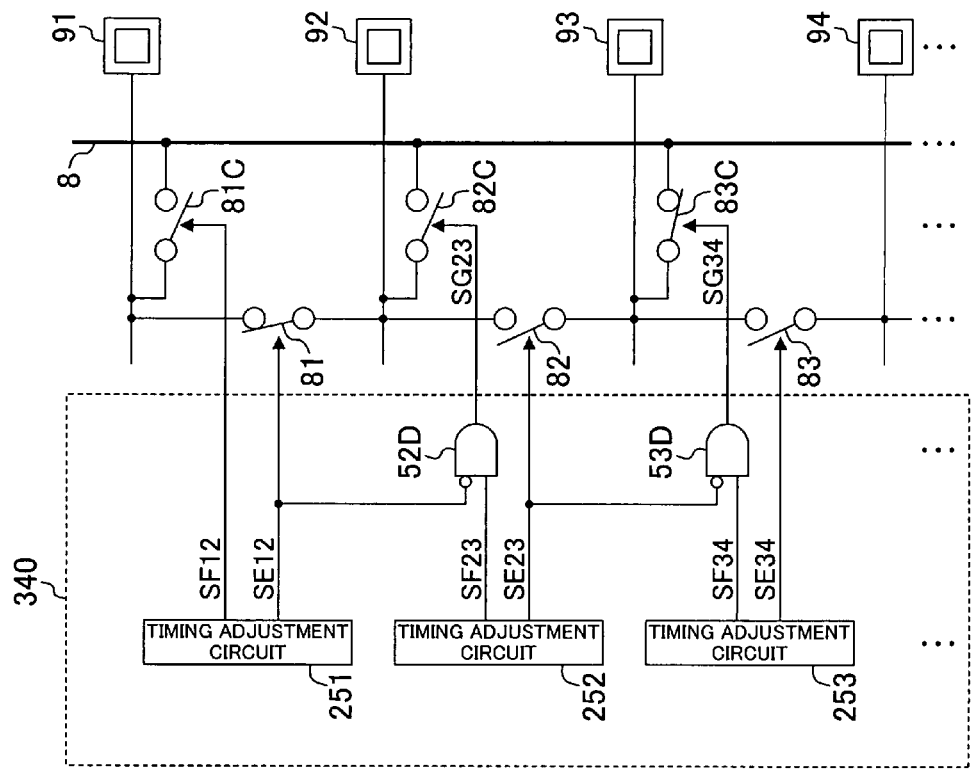
FIG. 17 is a block diagram showing the structure of a variation of the display driver of FIG. 11.

FIG. 17 is a block diagram showing the structure of a variation of the display driver of FIG. 11. The display driver of FIG. 17 includes AND gates (52D, 53D, . . . ) in addition to the components of the display driver of FIG. 11. Each of the common line connection switches is controlled according to the output of a corresponding AND gate. In FIG. 17, the same components as those shown in FIG. 11 are herein omitted.

Only when control signal SE12 is "L" while control signal SF23 is "H", the AND gate 52D outputs control signal SG23 at "H". The common line connection switch 82C is closed only when control signal SG23 is "H". Namely, the common line connection switch 82C can be closed only when the short circuit switch 81 is not closed. The other AND gates (53D, . . . ) control the common line connection switches (82C, . . . ) based on corresponding control signals in the same way. As a result, for example, the common line connection switch 84C of FIG. 14 and the common line connection switch 84C of FIG. 15 cannot be closed, so that more desirable control can be achieved.

Figure 18:
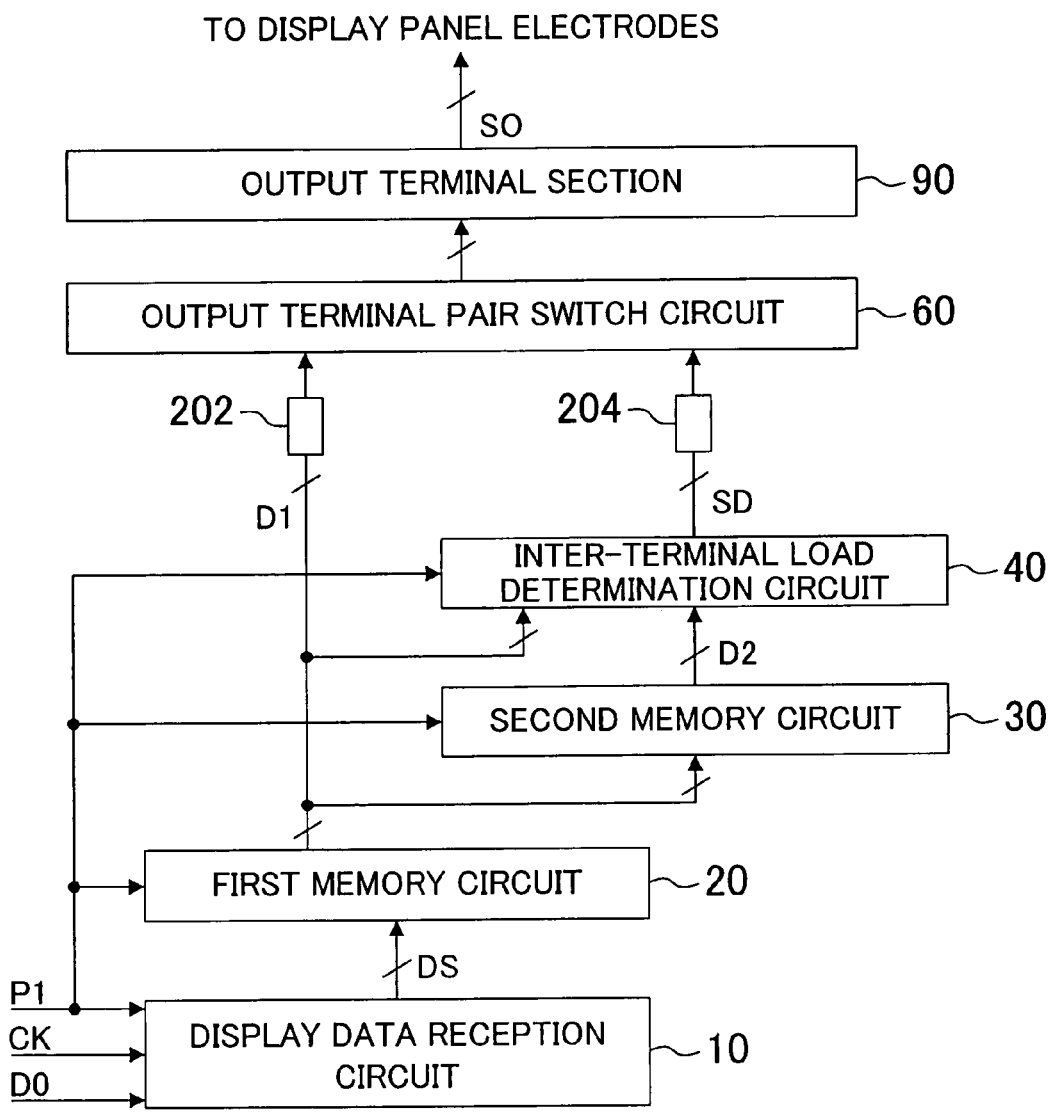
FIG. 18 is a block diagram showing the structure of another variation of the display driver of FIG. 1.

FIG. 18 is a block diagram showing the structure of another variation of the display driver of FIG. 1. The display driver of FIG. 18 includes a data timing adjustment circuit 202 and a control timing adjustment circuit 204 in addition to the components of the display driver of FIG. 1.

The data timing adjustment circuit 202 adjusts the timing of pixel data D1 output from the first memory circuit 20 to output the adjusted pixel data to the output terminal pair switch circuit 60. The control timing adjustment circuit 204 adjusts the timing of switch control signal SD output from the inter-terminal load determination circuit 40 to output the adjusted signal to the output terminal pair switch circuit 60.

Herein, the data timing adjustment circuit 202 and the control timing adjustment circuit 204 adjust the timing such that switch control signal SD is supplied to the output terminal pair switch circuit 60 before pixel data D1 is supplied to the output terminal pair switch circuit 60. As a result, a short circuit is surely established between output terminals immediately before the display line is switched.

It should be noted that the display driver may include only one of the data timing adjustment circuit 202 and the control timing adjustment circuit 204.

Figure 19A:
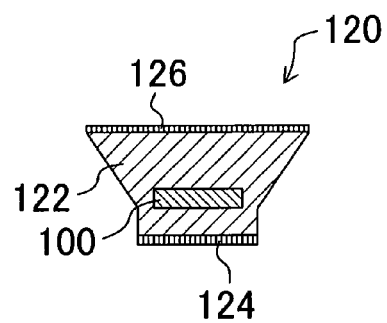
FIG. 19A shows the structure of a module package including the display driver of FIG. 1.
Figure 19B:
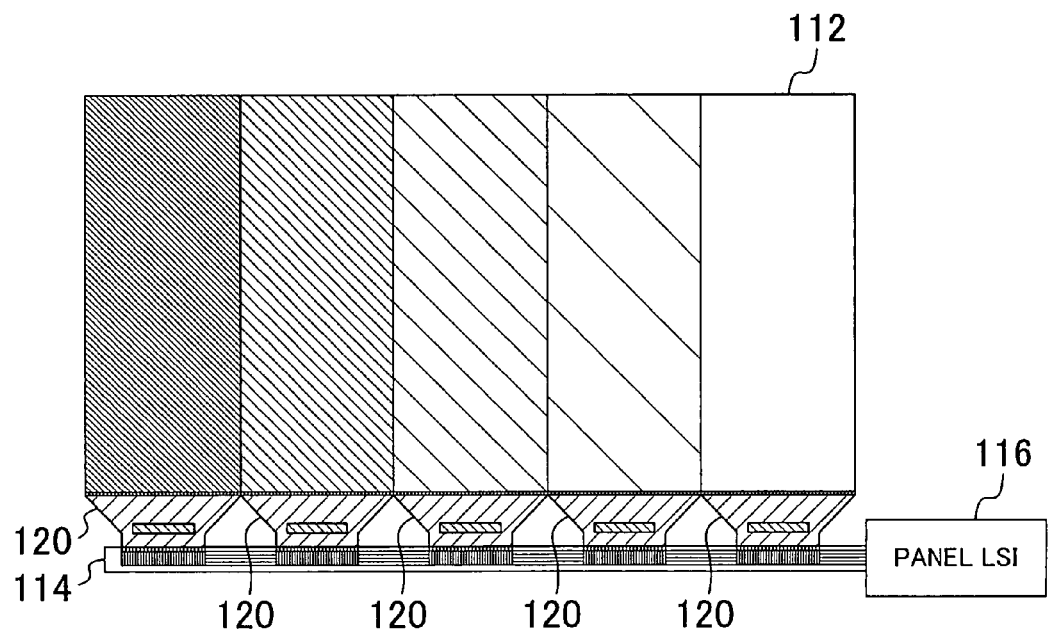
FIG. 19B shows the structure of a display panel module including the module packages of FIG. 19A.

FIG. 19A shows the structure of a module package including the display driver of FIG. 1. FIG. 19B shows the structure of a display panel module including the module packages of FIG. 19A.

The module package 120 of FIG. 19A includes the display driver 100, a flexible wiring board 122, an input signal terminal section 124 and an output signal terminal section 126. The flexible wiring board 122 transmits a signal supplied at the input signal terminal section 124 to the display driver 100 and transmits the output of the display driver 100 to the output signal terminal section 126.

The display panel module of FIG. 19B includes a PDP (display panel) 112, a common wiring board 114, a panel LSI 116, and a plurality of module packages 120. The PDP 112 includes a plurality of pixels and data electrodes corresponding to the pixels. The PDP 112 includes a plurality of pixel blocks. The module packages 120 correspond to the pixel blocks on a one-to-one basis.

The panel LSI 116 includes a circuit for controlling signal processing and outputs image signals, display control signals, control signals indicative of module packages to be driven, etc., to the common wiring board 114 for the control of display in the PDP 112. The common wiring board 114 has signal lines for transmitting the signals output from the panel LSI 116. The input signal terminal section 124 of each module package 120 is electrically connected to the common wiring board 114. The output signal terminal section 126 of each module package 120 is electrically connected to the PDP 112. The display driver 100 receives the image signals output from the panel LSI 116 as pixel data D0. The output of the display driver 100 is supplied to the data electrodes of the PDP 112.

Thus, since the display panel module of FIG. 19B includes a plurality of module packages 120 so that the display panel module can drive a large-screen PDP. Since each module package 120 uses the display driver 100, the power consumption can be reduced.

It should be noted that, in FIG. 19A and FIG. 19B, the display driver of FIG. 11, FIG. 17 or FIG. 18 may be used in place of the display driver 100 of FIG. 1.

Figure 20:
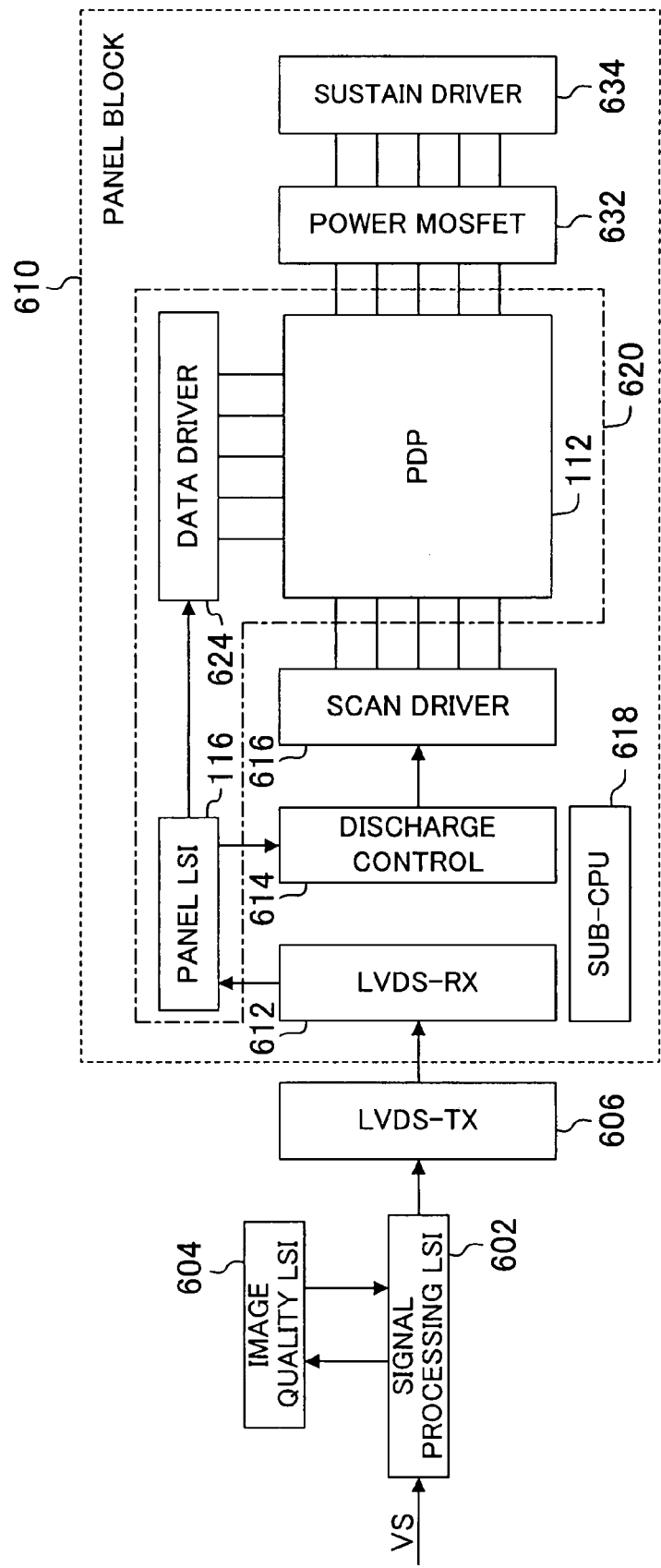
FIG. 20 is a block diagram showing an example of the structure of a television set which includes the display panel module of FIG. 19B.

FIG. 20 is a block diagram showing an example of the structure of a television set which includes the display panel module of FIG. 19B. The television set of FIG. 20 includes a signal processing LSI 602 for receiving and processing video signal VS, an image quality LSI 604, an LVDS transmitter 606, and a panel block 610. The panel block 610 includes an LVDS receiver 612, a discharge controller 614, a scan driver 616, a subsidiary CPU 618, a display panel module 620, a power MOSFET 632, and a sustain driver 634.

The display panel module 620 is the display panel module of FIG. 19B. The display panel module 620 includes a PDP 112, a panel LSI 116, and a data driver 624. The data driver 624 corresponds to the plurality of display drivers 100 shown in FIG. 19B.

Thus, the display driver of the present invention can be easily incorporated into a video display system, such as a television set, or the like, which includes a display panel, such as PDP, or the like. In the television set of FIG. 20, the power consumption by the display driving operation can be greatly reduced while the heat generated by the display driving operation can also be reduced.

In the above-described embodiments, the display panel is formed by PDP. However, other types of display panels, such as EL (electro-luminescent) panels, etc., may be used so long as they have capacitive loads.

As described above, the present invention can suppress both power consumption and heat generation and is therefore useful for a driver of a display panel which has a capacitive load, such as PDP, EL panel, etc.

What is claimed is:

1. A display driver, comprising:
a first memory circuit for storing a line of pixels constituting an image;
a second memory circuit for storing a line of pixels immediately previous to the line of pixels stored in the first memory circuit;
an output terminal pair switch circuit which outputs voltages each corresponding to a value of a pixel stored in the first memory circuit to a plurality of output terminals respectively corresponding to the pixels; and
an inter-terminal load determination circuit for determining, for every pair of first and second selected columns of pixels constituting the image, whether or not a short circuit is to be established between two of the plurality of output terminals which respectively correspond to the first and second columns based on values of at least three out of four pixels belonging to the first and second columns which are stored in the first and second memory circuits,
wherein if the inter-terminal load determination circuit determines that a short circuit is to be established, the output terminal pair switch circuit temporarily establishes a short circuit between the two output terminals before the voltages corresponding to the values of the pixels belonging to the first and second columns which are stored in the first memory circuit are output to the two output terminals.

2. The display driver of claim 1, wherein the output terminal pair switch circuit includes, for the every pair of selected columns, an independently-controllable short circuit switch for establishing a short circuit between the two output terminals.

3. The display driver of claim 2, wherein the output terminal pair switch circuit further includes, between output terminals connected to the short circuit switches and the first memory circuit, a plurality of output switches each of which controls whether or not the voltage corresponding to the value of the pixel is output.

4. The display driver of claim 3, wherein the inter-terminal load determination circuit outputs a signal for controlling the short circuit switches and a signal for controlling the output switches as a switch control signal.

5. The display driver of claim 4 wherein, if the inter-terminal load determination circuit determines that a short circuit is to be established, the inter-terminal load determination circuit outputs the switch control signal such that the short circuit switch provided between the two output terminals is closed in a period between reception of a scan pulse signal of a display panel connected to the plurality of output terminals and start of display on the display panel and that the output switches connected to the two output terminals are opened before the short circuit switch is closed.

6. The display driver of claim 4, wherein the inter-terminal load determination circuit outputs the switch control signal such that the output switches connected to the two output terminals are opened before the inter-terminal load determination circuit makes a determination as to whether or not a short circuit is to be established.

7. The display driver of claim 1, wherein the first and second columns are adjacent columns.

8. The display driver of claim 1, wherein the first and second columns are two columns which are selected from the columns of pixels constituting the image with repetitive selection allowed.

9. The display driver of claim 1, wherein the first and second columns are two columns which are selected from the columns of pixels constituting the image with repetitive selection disallowed.

10. The display driver of claim 1, further comprising:
a common line; and
a plurality of common line connection switches for connecting the output terminals connected to the short circuit switches and the common line,
wherein if the inter-terminal load determination circuit does not determine that a short circuit is to be established while a value of a pixel which belongs to the first column and is stored in the second memory circuit and a value of a pixel which belongs to the first column and is stored in the first memory circuit are different, the output terminal pair switch circuit controls a common line connection switch provided between the output terminal corresponding to the first column and the common line such that the common line connection switch is closed.

11. The display driver of claim 10, wherein the common line is supplied with an average voltage of a high-level voltage and a low-level voltage which are supplied to the plurality of output terminals.

12. The display driver of claim 10 wherein, when a short circuit is established between the output terminal corresponding to the first column and an output terminal other than the output terminal corresponding to the second column, the output terminal pair switch circuit controls a common line connection switch provided between the output terminal corresponding to the first column and the common line such that the common line connection switch is not closed.

13. The display driver of claim 1, further comprising, in at least one of an interval between the first memory circuit and the output terminal pair switch circuit and an interval between the inter-terminal load determination circuit and the output terminal pair switch circuit, a timing adjustment circuit for adjusting a timing of a signal.

14. The display driver of claim 1, wherein:
the inter-terminal load determination circuit compares values of two out of the four pixels which are stored in the second memory circuit to generate a first comparison result;
the inter-terminal load determination circuit compares values of two out of the four pixels which belong to the first column to generate a second comparison result; and
if both the first and second comparison results are indicative that the compared values are not identical, the inter-terminal load determination circuit determines that a short circuit is to be established between the two output terminals.

15. The display driver of claim 1, wherein:
the inter-terminal load determination circuit compares values of two out of the four pixels which are stored in the second memory circuit to generate a first comparison result;
the inter-terminal load determination circuit compares a value of a pixel which belongs to the first column and is stored in the second memory circuit and a value of a pixel which belongs to the second column and is stored in the first memory circuit to generate a second comparison result; and
if the first comparison result is indicative that the compared values are not identical while the second comparison result is indicative that the compared values are identical, the inter-terminal load determination circuit determines that a short circuit is to be established between the two output terminals.

16. The display driver of claim 1, wherein:
the inter-terminal load determination circuit compares a value of a pixel which belongs to the first column and is stored in the second memory circuit and a value of a pixel which belongs to the second column and is stored in the first memory circuit to generate a first comparison result;
the inter-terminal load determination circuit compares values of two out of the four pixels which belong to the second column to generate a second comparison result; and
if the first comparison result is indicative that the compared values are identical while the second comparison result is indicative that the compared values are not identical, the inter-terminal load determination circuit determines that a short circuit is to be established between the two output terminals.

17. The display driver of claim 1, wherein:
the inter-terminal load determination circuit compares values of two out of the four pixels which are stored in any one of the first and second memory circuits to generate a first comparison result;
the inter-terminal load determination circuit compares values of two out of the four pixels which belong to the first column to generate a second comparison result;
the inter-terminal load determination circuit compares values of two out of the four pixels which belong to the second column to generate a third comparison result; and
if all the first, second and third comparison results are indicative that the compared values are not identical, the inter-terminal load determination circuit determines that a short circuit is to be established between the two output terminals.

18. The display driver of claim 1, wherein:
the inter-terminal load determination circuit compares values of two out of the four pixels which belong to the first column to generate a first comparison result;
the inter-terminal load determination circuit compares values of two out of the four pixels which are stored in the first memory circuit to generate a second comparison result;
the inter-terminal load determination circuit compares values of two out of the four pixels which are stored in the second memory circuit to generate a third comparison result; and
if all the first, second and third comparison results are indicative that the compared values are not identical, the inter-terminal load determination circuit determines that a short circuit is to be established between the two output terminals.

19. The display driver of claim 1, wherein:
the inter-terminal load determination circuit compares values of two out of the four pixels which belong to the first column to generate a first comparison result;
the inter-terminal load determination circuit compares a value of a pixel which belongs to the first column and is stored in the second memory circuit and a value of a pixel which belongs to the second column and is stored in the first memory circuit to generate a second comparison result;
the inter-terminal load determination circuit compares a value of a pixel which belongs to the second column and is stored in the second memory circuit and a value of a pixel which belongs to the first column and is stored in the first memory circuit to generate a third comparison result; and
if the first comparison result is indicative that the compared values are not identical while the second and third comparison results are indicative that the compared values are identical, the inter-terminal load determination circuit determines that a short circuit is to be established between the two output terminals.

20. The display driver of claim 1, wherein:
the inter-terminal load determination circuit compares values of two out of the four pixels which are stored in any one of the first and second memory circuits to generate a first comparison result;
the inter-terminal load determination circuit compares a value of a pixel which belongs to the first column and is stored in the second memory circuit and a value of a pixel which belongs to the second column and is stored in the first memory circuit to generate a second comparison result;
the inter-terminal load determination circuit compares a value of a pixel which belongs to the second column and is stored in the second memory circuit and a value of a pixel which belongs to the first column and is stored in the first memory circuit to generate a third comparison result; and
if the first comparison result is indicative that the compared values are not identical while the second and third comparison results are indicative that the compared values are identical, the inter-terminal load determination circuit determines that a short circuit is to be established between the two output terminals.

21. A display panel module, comprising:
a display panel having a plurality of pixel blocks; and
a plurality of display drivers for driving the pixel blocks of the display panel,
wherein each of the display drivers includes
a first memory circuit for storing a line of pixels constituting an image,
a second memory circuit for storing a line of pixels immediately previous to the line of pixels stored in the first memory circuit,
an output terminal pair switch circuit which outputs voltages each corresponding to a value of a pixel stored in the first memory circuit to a plurality of output terminals respectively corresponding to the pixels, and
an inter-terminal load determination circuit for determining, for every pair of first and second selected columns of pixels constituting the image, whether or not a short circuit is to be established between two of the plurality of output terminals which respectively correspond to the first and second columns based on values of at least three out of four pixels belonging to the first and second columns which are stored in the first and second memory circuits, and if the inter-terminal load determination circuit determines that a short circuit is to be established, the output terminal pair switch circuit temporarily establishes a short circuit between the two output terminals before the voltages corresponding to the values of the pixels belonging to the first and second columns which are stored in the first memory circuit are output to the two output terminals.

* * * * *